United States Patent
Gaal et al.

(10) Patent No.: US 11,166,274 B2
(45) Date of Patent: Nov. 2, 2021

(54) USER EQUIPMENT-SPECIFIC HYBRID AUTOMATIC REPEAT REQUEST TIMELINE OFFSET

(71) Applicant: QUALCOMM Incorporated, San Diego, CA (US)

(72) Inventors: Peter Gaal, San Diego, CA (US); Yang Yang, San Diego, CA (US); Peter Pui Lok Ang, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 176 days.

(21) Appl. No.: 16/110,556

(22) Filed: Aug. 23, 2018

(65) Prior Publication Data

US 2019/0069290 A1 Feb. 28, 2019

Related U.S. Application Data

(60) Provisional application No. 62/549,945, filed on Aug. 24, 2017.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 1/1812* (2013.01); *H04L 1/1854* (2013.01);
(Continued)

(58) Field of Classification Search
CPC .............. H04W 72/0446; H04W 76/27; H04L 1/1812; H04L 1/1854
See application file for complete search history.

(56) References Cited

U.S. PATENT DOCUMENTS

2011/0292900 A1* 12/2011 Ahn .................. H04L 1/1861
370/329
2012/0300722 A1* 11/2012 Kim ................... H04L 5/0094
370/329
(Continued)

OTHER PUBLICATIONS

Huawei et al., "TDM of LTE and NR Uplinks for LTE-NR Dual Connectivity", 3GPP Draft, R1-1712163, 3rd Generation Partnership Project (3GPP), Mobile Competence Centre, 650, Route Des Lucioles, F-06921 Sophia-Antipolis Cedex, France vol. RAN WG1. No. Prague, Czech 2Republic, Aug. 21, 2017-Aug. 25, 2017, Aug. 20, 2017 (Aug. 20, 2017), XP051314982, 7 Pages, Retrieved from the Internet: URL:http://www.3gpp.org/ftp/Meetings 3GPP SYNC/RAN1/Docs/ [retrieved on Aug. 20, 2017].
(Continued)

*Primary Examiner* — Jael M Ulysse
(74) *Attorney, Agent, or Firm* — Qualcomm Incorporated

(57) ABSTRACT

Wireless communications systems may support user equipment (UE)-specific hybrid automatic repeat request (HARQ) timeline offsets such that transmission time intervals (TTIs) reserved for uplink HARQ transmissions are reserved on a per UE basis (e.g., TTIs are not reserved or designated on a network level or aligned across all or many UEs within the system). That is, UEs within a wireless communications system may employ a UE-specific offset for their respective HARQ timelines. UE-specific HARQ timeline offsets may be derived, by the UEs, explicitly or implicitly. Further, the network (e.g., a base station) may configure UE-specific HARQ timeline offsets to be distributed in time to avoid uplink HARQ transmission collisions between UEs, to eliminate the loss of TTIs for a second carrier operation (e.g., such as NR uplink) on a network wide basis, etc. The base station may then communicate with the UEs according to their corresponding UE-specific offset HARQ timelines.

14 Claims, 17 Drawing Sheets

(51) Int. Cl.
  *H04L 1/18* (2006.01)
  *H04W 76/27* (2018.01)
  *H04L 5/14* (2006.01)
  *H04W 74/08* (2009.01)

(52) U.S. Cl.
  CPC .............. *H04L 5/0055* (2013.01); *H04L 5/14* (2013.01); *H04W 74/0816* (2013.01); *H04W 76/27* (2018.02); *H04L 5/0091* (2013.01)

(56) References Cited

U.S. PATENT DOCUMENTS

| | | | | |
|---|---|---|---|---|
| 2012/0320847 A1* | 12/2012 | Nam | ................ | H04W 72/0406 370/329 |
| 2013/0230017 A1* | 9/2013 | Papasakellariou | .... | H04L 1/1861 370/330 |
| 2013/0301490 A1* | 11/2013 | He | ................... | H04W 52/0209 370/280 |
| 2014/0092865 A1* | 4/2014 | Heo | ................. | H04W 36/0088 370/331 |
| 2014/0269452 A1* | 9/2014 | Papasakellariou | .... | H04L 5/0055 370/280 |
| 2014/0328260 A1* | 11/2014 | Papasakellariou | .... | H04L 1/1887 370/329 |
| 2014/0362798 A1* | 12/2014 | Shu | ...................... | H04L 1/1854 370/329 |
| 2015/0023269 A1* | 1/2015 | Lee | ...................... | H04L 5/0055 370/329 |
| 2015/0071209 A1* | 3/2015 | Chae | .................... | H04L 1/1887 370/329 |
| 2015/0085713 A1 | 3/2015 | He et al. | | |
| 2015/0124671 A1* | 5/2015 | Tabet | ................... | H04L 1/1887 370/311 |
| 2016/0112181 A1* | 4/2016 | Tabet | ............... | H04W 72/0413 370/296 |
| 2016/0143035 A1* | 5/2016 | Xue | .................... | H04W 72/048 370/329 |
| 2016/0249338 A1* | 8/2016 | Hwang | ................ | H04L 5/1469 |
| 2016/0269104 A1* | 9/2016 | Lee | ...................... | H04L 5/0053 |
| 2017/0094642 A1* | 3/2017 | Lee | ...................... | H04L 1/1887 |

OTHER PUBLICATIONS

International Search Report and Written Opinion—PCT/US2018/047898—ISA/EPO—dated Nov. 22, 2018.
Huawei, et al., "Handling Collisions Between n+4 and n+3," 3GPP Draft; R1-1704256, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017, XP051242408, 3 pages, Retrieved from the Internet: URL: http://www.3gpp.org/ftp/Meetings_3GPP_SYNC/RAN1/Docs/ [retrieved on Apr. 2, 2017].

* cited by examiner

USER EQUIPMENT-SPECIFIC HYBRID AUTOMATIC REPEAT REQUEST TIMELINE OFFSET

CROSS REFERENCES

The present Application for Patent claims the benefit of U.S. Provisional Patent Application No. 62/549,945 by GAAL, et al., entitled "USER EQUIPMENT-SPECIFIC HYBRID AUTOMATIC REPEAT REQUEST TIMELINE OFFSET," filed Aug. 24, 2017, assigned to the assignee hereof, and expressly incorporated herein.

BACKGROUND

The following relates generally to wireless communication, and more specifically to user equipment (UE)-specific hybrid automatic repeat request (HARQ) timeline offset.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UEs.

In some instances, transmission errors between mobile devices and base stations are avoided or corrected by utilizing an automatic repeat request (ARQ) scheme. An ARQ scheme may be employed to detect whether a received packet is in error. For example, in an ARQ scheme, a receiver may notify a transmitter with a positive acknowledgment (ACK), when a packet is received free from errors; and the receiver may notify the transmitter with a negative acknowledgment (NAK), if an error is detected. In some cases, a HARQ scheme is employed to correct some errors and to detect and discard certain uncorrectable packets. In some cases, mobile devices may be configured with multiple carriers, which may operate according to a carrier aggregation scheme. In such cases, uplink HARQ transmissions (e.g., ACKs/NAKs) associated with a first carrier may interfere with or block certain transmission time intervals (TTIs) (e.g., subframes, slots, etc.) such that uplink transmissions associated with other carriers may be unsuccessful or unavailable during the blocked TTIs. Improved HARQ techniques may thus be desired.

SUMMARY

The described techniques relate to improved methods, systems, devices, or apparatuses that support user equipment (UE)-specific hybrid automatic repeat request (HARQ) timeline offset. Generally, the described techniques provide for wireless communications systems supporting UE-specific HARQ timeline offsets such that transmission time intervals (TTIs) reserved for uplink HARQ transmissions are reserved on a per UE basis (e.g., TTIs are not reserved or designated on a network level or aligned across all or many UEs within the system). As such, uplink capacity associated with other carriers (e.g., one or more carriers configured for the UE that are not associated with the HARQ timeline) may be improved. That is, UEs within a wireless communications system may employ a UE-specific offset for their respective HARQ timelines. The offset may be defined in terms of time (e.g., ms) or in terms of TTIs (e.g., integer multiples of a TTI duration or any fraction of a TTI duration). UE-specific HARQ timeline offsets may be derived, by the UEs, explicitly or implicitly. Further, the network (e.g., a base station) may configure distributed UE-specific HARQ timeline offsets to avoid uplink HARQ transmission collisions between UEs, to eliminate the loss of TTIs for a second carrier operation (e.g., such as New Radio (NR) uplink) on a network wide basis, etc.

A method of wireless communication is described. The method may include identifying a reference HARQ timeline, identifying a UE-specific HARQ timeline offset to be applied by the UE to the reference HARQ timeline, determining a UE-specific offset HARQ timeline by applying the UE-specific HARQ timeline offset to the reference HARQ timeline, and transmitting one or more acknowledgements in a TTI in accordance with the UE-specific offset HARQ timeline.

An apparatus for wireless communication is described. The apparatus may include means for identifying a reference HARQ timeline, means for identifying a UE-specific HARQ timeline offset to be applied by the UE to the reference HARQ timeline, means for determining a UE-specific offset HARQ timeline by applying the UE-specific HARQ timeline offset to the reference HARQ timeline, and means for transmitting one or more acknowledgements in a TTI in accordance with the UE-specific offset HARQ timeline.

Another apparatus for wireless communication is described. The apparatus may include a processor, memory in electronic communication with the processor, and instructions stored in the memory. The instructions may be operable to cause the processor to identify a reference HARQ timeline, identify a UE-specific HARQ timeline offset to be applied by the UE to the reference HARQ timeline, determine a UE-specific offset HARQ timeline by applying the UE-specific HARQ timeline offset to the reference HARQ timeline, and transmit one or more acknowledgements in a TTI in accordance with the UE-specific offset HARQ timeline.

A non-transitory computer readable medium for wireless communication is described. The non-transitory computer-readable medium may include instructions operable to cause a processor to identify a reference HARQ timeline, identify a UE-specific HARQ timeline offset to be applied by the UE to the reference HARQ timeline, determine a UE-specific offset HARQ timeline by applying the UE-specific HARQ timeline offset to the reference HARQ timeline, and transmit one or more acknowledgements in a TTI in accordance with the UE-specific offset HARQ timeline.

In some examples of the method, apparatus, and non-transitory computer-readable medium described above, determining the UE-specific offset HARQ timeline comprises: adding the UE-specific HARQ timeline offset to uplink TTI indices in the reference HARQ timeline.

In some examples of the method, apparatus, and non-transitory computer-readable medium described above, determining the UE-specific offset HARQ timeline comprises: adjusting uplink TTI indices in the reference HARQ timeline by a function of the UE-specific HARQ timeline offset.

In some examples of the method, apparatus, and non-transitory computer-readable medium described above, identifying the reference HARQ timeline comprises: receiving an indication of the reference HARQ timeline for a cell in which the UE may be communicating.

In some examples of the method, apparatus, and non-transitory computer-readable medium described above, identifying the UE-specific HARQ timeline offset comprises: receiving an indication of the UE-specific HARQ timeline offset from a base station.

In some examples of the method, apparatus, and non-transitory computer-readable medium described above, receiving the indication of the UE-specific HARQ timeline offset comprises: receiving the indication via downlink control information (DCI) or via radio resource control (RRC) messaging.

In some examples of the method, apparatus, and non-transitory computer-readable medium described above, identifying the UE-specific HARQ timeline offset comprises: determining the UE-specific HARQ timeline offset based at least in part on rules known by the UE.

In some examples of the method, apparatus, and non-transitory computer-readable medium described above, identifying the UE-specific HARQ timeline offset comprises: determining the UE-specific HARQ timeline offset based at least in part on an identification (ID) of the UE.

In some examples of the method, apparatus, and non-transitory computer-readable medium described above, the UE may be configured to communicate using multiple radio access technologies (RATs) via time division multiplexing (TDM).

In some examples of the method, apparatus, and non-transitory computer-readable medium described above, the UE may be configured to communicate using both Long Term Evolution (LTE) and New Radio (NR), and wherein the one or more acknowledgements may be transmitted as LTE communications. In some examples, the LTE RAT is configured for frequency division duplexed (FDD) communications.

In some examples of the method, apparatus, and non-transitory computer-readable medium described above, the one or more acknowledgements in the TTI correspond to a plurality of previous downlink transmissions.

A method of wireless communication is described. The method may include identifying a reference HARQ timeline, determining one or more UE-specific HARQ timeline offsets to be applied by a corresponding one or more UEs to the reference HARQ timeline, determining corresponding UE-specific offset HARQ timelines by applying respective UE-specific HARQ timeline offsets to the reference HARQ timeline, and communicating with the one or more UEs in accordance with the corresponding UE-specific offset HARQ timelines.

An apparatus for wireless communication is described. The apparatus may include means for identifying a reference HARQ timeline, means for determining one or more UE-specific HARQ timeline offsets to be applied by a corresponding one or more UEs to the reference HARQ timeline, means for determining corresponding UE-specific offset HARQ timelines by applying respective UE-specific HARQ timeline offsets to the reference HARQ timeline, and means for communicating with the one or more UEs in accordance with the corresponding UE-specific offset HARQ timelines.

Another apparatus for wireless communication is described. The apparatus may include a processor, memory in electronic communication with the processor, and instructions stored in the memory. The instructions may be operable to cause the processor to identify a reference HARQ timeline, determine one or more UE-specific HARQ timeline offsets to be applied by a corresponding one or more UEs to the reference HARQ timeline, determine corresponding UE-specific offset HARQ timelines by applying respective UE-specific HARQ timeline offsets to the reference HARQ timeline, and communicate with the one or more UEs in accordance with the corresponding UE-specific offset HARQ timelines.

A non-transitory computer readable medium for wireless communication is described. The non-transitory computer-readable medium may include instructions operable to cause a processor to identify a reference HARQ timeline, determine one or more UE-specific HARQ timeline offsets to be applied by a corresponding one or more UEs to the reference HARQ timeline, determine corresponding UE-specific offset HARQ timelines by applying respective UE-specific HARQ timeline offsets to the reference HARQ timeline, and communicate with the one or more UEs in accordance with the corresponding UE-specific offset HARQ timelines.

In some examples of the method, apparatus, and non-transitory computer-readable medium described above, determining the one or more UE-specific HARQ timeline offsets comprises: determining different UE-specific HARQ timeline offsets for each of the corresponding one or more UEs.

In some examples of the method, apparatus, and non-transitory computer-readable medium described above, determining the one or more UE-specific HARQ timeline offsets comprises: determining UE-specific HARQ timeline offsets for each of the corresponding one or more UEs so as to avoid overlap of corresponding TTIs in which acknowledgements may be received from the one or more UEs.

In some examples of the method, apparatus, and non-transitory computer-readable medium described above, determining the one or more UE-specific HARQ timeline offsets comprises: determining UE-specific HARQ timeline offsets for each of the corresponding one or more UEs so as to avoid physical uplink control channel (PUCCH) resource collisions between the one or more UEs.

Some examples of the method, apparatus, and non-transitory computer-readable medium described above may further include processes, features, means, or instructions for indicating the one or more UE-specific HARQ timeline offsets to the corresponding one or more UEs.

In some examples of the method, apparatus, and non-transitory computer-readable medium described above, indicating the one or more UE-specific HARQ timeline offsets to the corresponding one or more UEs comprises: transmitting an indication of the one or more UE-specific HARQ timeline offsets via DCI or via RRC messaging.

In some examples of the method, apparatus, and non-transitory computer-readable medium described above, determining the one or more UE-specific HARQ timeline offsets comprises: determining the UE-specific HARQ timeline offset based at least in part on information received from the corresponding one or more UEs.

Some examples of the method, apparatus, and non-transitory computer-readable medium described above may further include processes, features, means, or instructions for transmitting an indication of the reference HARQ timeline to the one or more UEs.

In some examples of the method, apparatus, and non-transitory computer-readable medium described above, communicating with the one or more UEs comprises: receiving, from at least one of the one or more UEs, one or more acknowledgements in a corresponding TTI in accordance with the corresponding UE-specific offset HARQ timeline.

In some examples of the method, apparatus, and non-transitory computer-readable medium described above, at least some of the one or more UEs may be configured to communicate using multiple RATs via TDM, and wherein communicating by the base station with the one or more UEs may be via LTE. In some examples, the LTE RAT is configured for FDD communications.

DETAILED DESCRIPTION

Figure 1:
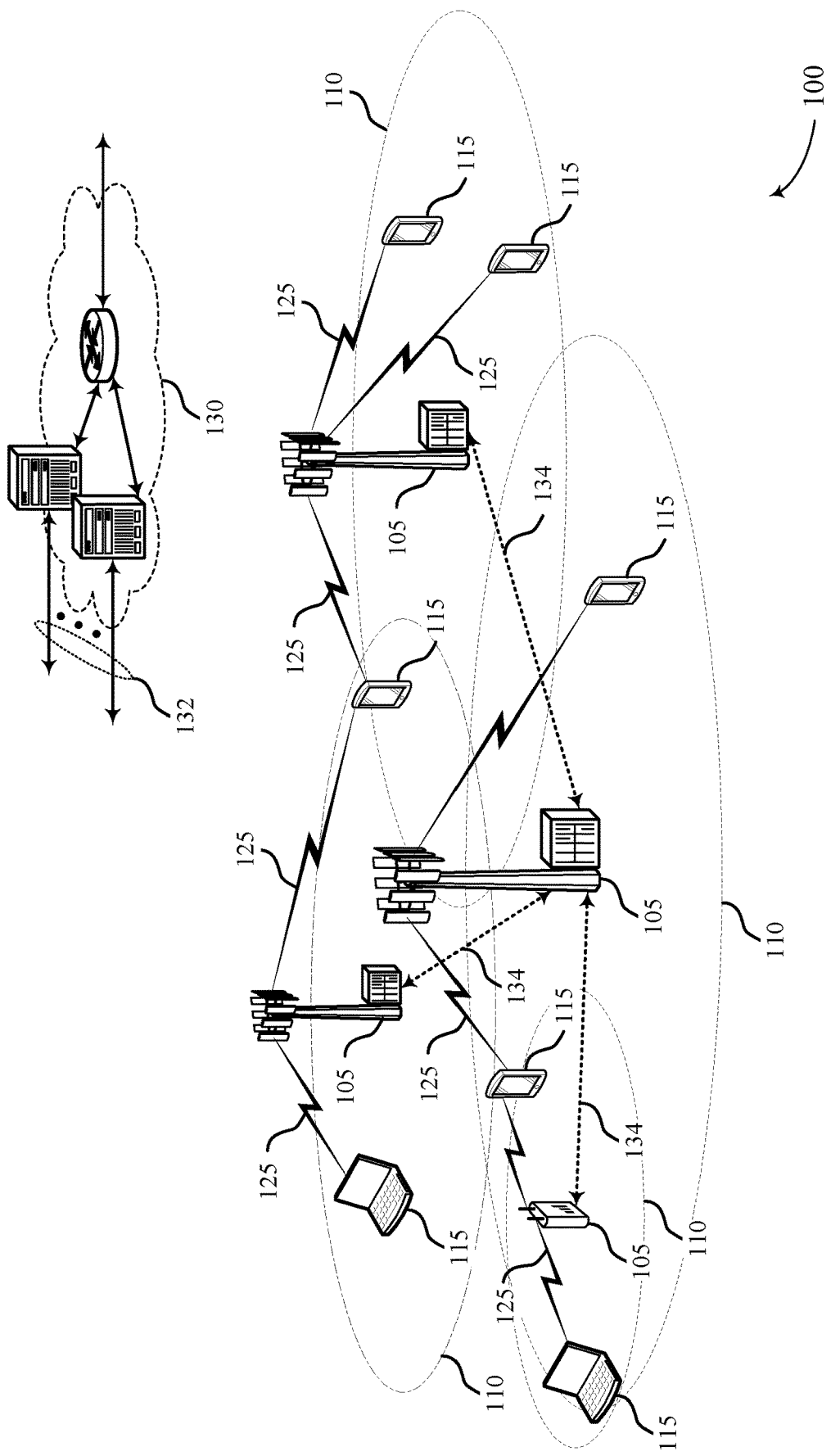
FIG. 1 illustrates an example of a system for wireless communication that supports user equipment (UE)-specific hybrid automatic repeat request (HARQ) timeline offset in accordance with aspects of the present disclosure.

In some wireless communications systems, wireless devices (e.g., user equipment (UE)) may support communications over multiple carriers using carrier aggregation. In some cases, UEs may be configured with carriers utilizing different radio access technologies (e.g., a UE may have Long Term Evolution (LTE) carriers as well as New Radio (NR) carriers). UEs configured with multiple carriers may be unable to transmit on more than one carrier at a given time. As an example, a UE may not be able to transmit NR uplink and LTE uplink during a given transmission time interval (TTI) due to, for example, radio frequency constraints (e.g., transceiver/modem architecture may not support or be capable of frequency division multiplexing (FDM) two or more carriers). As such, uplink carriers (e.g., NR uplink and LTE uplink) may exemplify time division multiplexing (TDM). Therefore, a TTI utilized by a carrier (e.g., for uplink transmissions) may effectively block other carriers supported by the UE during that TTI.

Wireless communications systems may utilize hybrid automatic repeat request (HARQ) schemes to correct transmission errors and to detect and discard certain uncorrectable packets. Such HARQ schemes may reserve or designate certain TTIs for uplink HARQ transmissions (e.g., positive acknowledgment (ACKs)/negative acknowledgments (NAKs)). Designation of such TTIs may effectively block communications over other carriers during the duration of the TTIs. In some cases, UEs within wireless communications system may all be associated with aligned HARQ timelines, such that TTIs reserved for uplink HARQ transmissions may be consistent across all UEs within the system. In such cases, those TTIs reserved for uplink HARQ transmissions may be blocked on a network wide basis (e.g., those TTIs may be blocked or unavailable for transmissions via other carriers, such as NR transmissions, for all UEs within the wireless communications system).

According to techniques described herein, wireless communications systems may support UE-specific HARQ timeline offsets such that TTIs reserved for uplink HARQ transmissions are reserved on a per UE basis (e.g., TTIs are not reserved or designated on a network level or aligned across all or many UEs within the system). As such, uplink capacity associated with the other carrier (e.g., the one or more carriers not associated with the HARQ timeline) may be improved. For example, UEs that are assigned or configured with multiple uplink carriers (e.g., a NR uplink carrier and a LTE uplink carrier) may not be able to utilize more than one uplink carrier at the same time in a frequency division multiplexing (FDM) manner due to radio frequency or modem limitations. In such cases, when the UE transmits on one uplink carrier in a TTI (e.g., in a reserved slot, reserved subframe, reserved TTI, etc.) the other carriers may not be utilized during that TTI. Such may result in a loss in uplink capacity as well as in downlink capacity in scenarios where HARQ uplink/downlink timelines or configurations are fixed. To alleviate such loss in capacity, transmission of HARQ feedback (e.g., ACK/NAK) for several or many downlink transmissions may occur in a single uplink TTI (e.g., a TTI may be reserved for several downlink transmissions). However, if all UEs within the wireless communications system utilize the same uplink TTI in the same carrier for the transmission of HARQ feedback, the same slot in other carriers will be blocked completely for all the UEs and thus may be unusable. The techniques discussed herein may add a UE-specific offset such that each UE may have a UE-specific offset HARQ timeline. As such, issues associated with uplink resource blocking may be reduced or alleviated (e.g., in cases where UEs are assigned with multiple uplink carriers in a statistical multiplexing sense).

That is, UEs within a wireless communications system may employ a UE-specific offset for their respective HARQ timelines. The offset may be defined in terms of time (e.g., ms) or in terms of TTIs (e.g., integer multiples of a TTI duration or any fraction of a TTI duration). As discussed in more detail below, UE-specific HARQ timeline offsets may be derived, by the UEs, explicitly or implicitly. Further, the network (e.g., the wireless communications system) may configure UE-specific HARQ timeline offsets to avoid uplink HARQ transmission collisions between UEs, to distribute reserved uplink HARQ TTIs (e.g., fixed LTE TTIs), to eliminate the loss of TTIs for a second carrier operation (e.g., such as NR) on a network wide basis, etc. Such techniques may result in increased system performance and reduced control channel collisions (e.g., control channel collisions associated with uplink HARQ transmissions).

Aspects of the disclosure are initially described in the context of a wireless communications system. Example UE HARQ timelines, network HARQ timelines illustrating UE-specific HARQ timeline offsets, and process flows for implementing techniques discussed herein are then described. Aspects of the disclosure are further illustrated by and described with reference to apparatus diagrams, system diagrams, and flowcharts that relate to UE-specific HARQ timeline offset.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. In some cases, HARQ may be transmitted according to a certain timeline established by a subframe or TTI configuration. In such cases, HARQ is transmitted after a certain duration that allows for the demodulation and processing of a received message.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe (e.g., such as a slot) or may be dynamically selected (e.g., in bursts of shortened TTIs (sTTIs) or in selected component carriers using sTTIs). In the examples described herein, a TTI may refer to a slot, a subframe, or some other duration of time.

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology (RAT). Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different RATs (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular RAT (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support UE-specific HARQ timeline offsets such that TTIs reserved for uplink HARQ transmissions are reserved on a per UE 115 basis (e.g., TTIs are not reserved or designated on a network level or aligned across all or many UEs 115 within the wireless communications system 100). As such, uplink capacity associated with the other carrier (e.g., the one or more carriers not associated with the HARQ timeline) may be improved. That is, UEs 115 within wireless communications system 100 may employ a UE-specific offset for their respective HARQ timelines. The offset may be defined in terms of time (e.g., ms) or in terms of TTIs (e.g., integer multiples of a TTI duration or any fraction of a TTI duration). As discussed in more detail below, UE-specific HARQ timeline offsets may be derived, by each of the UEs 115, explicitly or implicitly. Further, the network (e.g., the wireless communications system 100) may configure UE-specific HARQ timeline offsets to avoid uplink HARQ transmission collisions between UEs 115, to distribute reserved uplink HARQ TTIs (e.g., fixed LTE TTIs), to eliminate the loss of TTIs for a second carrier operation (e.g., such as NR) on a network wide basis, etc. Such techniques may result in increased system performance and reduced control channel collisions (e.g., control channel collisions associated with uplink HARQ transmissions).

Figure 2:
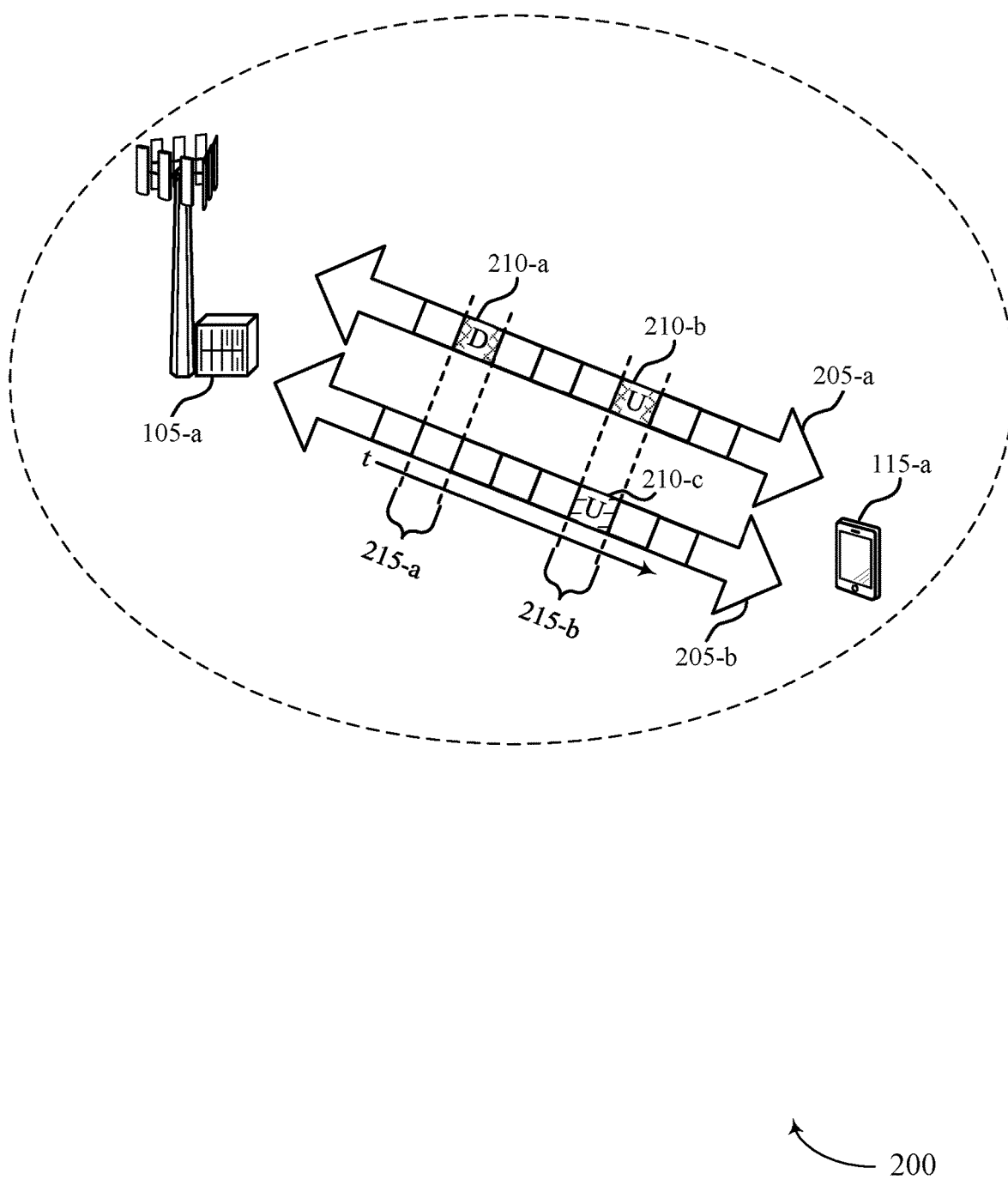
FIG. 2 illustrates an example of a wireless communications system that supports UE-specific HARQ timeline offset in accordance with aspects of the present disclosure.

FIG. 2 illustrates an example of a wireless communications system 200 that supports UE-specific HARQ timeline offset in accordance with various aspects of the present disclosure. In some examples, wireless communications system 200 may implement aspects of wireless communication system 100. Wireless communications system 200 may include a base station 105-a which may be an example of a base station 105 as described with reference to FIG. 1. Further, wireless communications system 200 may include a UE 115-a which may be an example of a UE 115 as described with reference to FIG. 1. In the present example, UE 115-a may be configured with two carriers, carrier 205-a (e.g., an LTE carrier) and carrier 205-b (e.g., a NR carrier). Communications may be either uplink or downlink via slots 210 (or subframes) occurring during a TTI 215. In the present example, communications associated with carrier 205-a and carrier 205-b may be TDM (e.g., uplink transmissions over both carriers may not occur during the same TTI 215). Further, communications associated with a given carrier (e.g., uplink and downlink for a carrier) may be either time division duplexed (TDD) or frequency division duplexed (FDD).

In some wireless communications systems, wireless devices (e.g., UE 115-a) may support communications over multiple carriers 205 using carrier aggregation. In some cases, UE 115-a may be configured with carriers utilizing different RATs (e.g., UE 115-a may be configured with an LTE carrier 205-a as well as a NR carrier 205-b). In some cases, UE 115-a may be unable to transmit on more than one carrier 205 at a given time. As an example, UE 115-a may not be able to transmit NR uplink and LTE uplink during a given TTI 215 due to, for example, radio frequency constraints (e.g., transceiver/modem architecture may not support or be capable of FDM for two or more carriers 205). As such, uplink carriers 205 (e.g., NR uplink and LTE uplink) may exemplify TDM. Therefore, a TTI 215 utilized by a carrier (e.g., for uplink transmissions) may effectively block other carriers supported by the UE during that TTI. According to the present example, an uplink transmission during a TTI 215-b via slot 210-a over carrier 205-b (e.g., a NR carrier) may block uplink transmissions during TTI 215-b via slot 210-b over carrier 205-a (e.g., a LTE carrier). In some cases, if such a transmission via slot 210-b is known in advance, downlink transmissions via slot 210-a over carrier 205-a may also be blocked, as corresponding HARQ feedback via slot 210-b may be known to be blocked. In cases where transmission via slot 210-b is not known in advance, a downlink transmission may still occur via slot 210-a, however the base station 105-a may not receive HARQ feedback, which may result in recover procedures and system latencies.

Therefore, wireless communications system 200 may utilize HARQ schemes that reserve or designate certain TTIs for uplink HARQ transmissions (e.g., ACKs/NAKs). Designation of such TTIs may effectively block communications over other carriers during the duration of the TTIs. For example, wireless communications system 200 may designate or configure TTI 215-b for uplink HARQ transmissions associated with carrier 205-a. In such cases, TTI 215-b may be blocked for transmissions via carrier 205-b (e.g., for NR uplink). Further, wireless communications system 200 may support TTIs 215 that are designated for multiple downlink TTIs or slots (e.g., several downlink subframes may map to a single uplink subframe for HARQ feedback, thus reducing the amount of reserved or blocked TTIs for uplink HARQ). Regardless of the number of TTIs reserved for HARQ feedback associated with carrier 205-a, if several or all other UEs within wireless communications system 200 have similar TTIs reserved for HARQ feedback (e.g., if UEs within wireless communications system 200 have aligned HARQ timelines), the reserved TTIs may be unusable for transmissions associated with carrier 205-b (e.g., NR transmissions) across the network or across all of wireless communications system 200.

According to techniques described herein, wireless communications system 200 may support UE-specific HARQ timeline offsets such that TTIs 215 reserved for uplink HARQ transmissions are reserved on a per UE basis (e.g., TTIs are not effectively reserved or designated on a network level or aligned across all or many UEs within the system). As such, uplink capacity associated with the other carrier (e.g., the one or more carriers not associated with the HARQ timeline, such as carrier 205-b) may be improved. That is, UEs 115 within wireless communications system 200 may employ a UE-specific offset (e.g., X) for their respective HARQ timelines. The offset, X, may be defined in terms of time (e.g., ms) or in terms of TTIs (e.g., integer multiples of a TTI duration or any fraction of a TTI duration). UE-specific HARQ timeline offsets may be derived, by the UEs 115, explicitly or implicitly. Further, wireless communications system 200 (e.g., base station 105-*a*) may configure UE-specific HARQ timeline offsets to avoid uplink HARQ transmission collisions between UEs, to distribute reserved uplink HARQ TTIs in time (e.g., misalign TTIs reserved for UE 115 HARQ feedback), to eliminate the loss of TTIs for a second carrier operation (e.g., such as NR) on a network wide basis, etc. Such techniques may result in increased system performance and reduced control channel collisions (e.g., physical uplink control channel (PUCCH) collisions associated with uplink HARQ transmissions).

Figure 3:
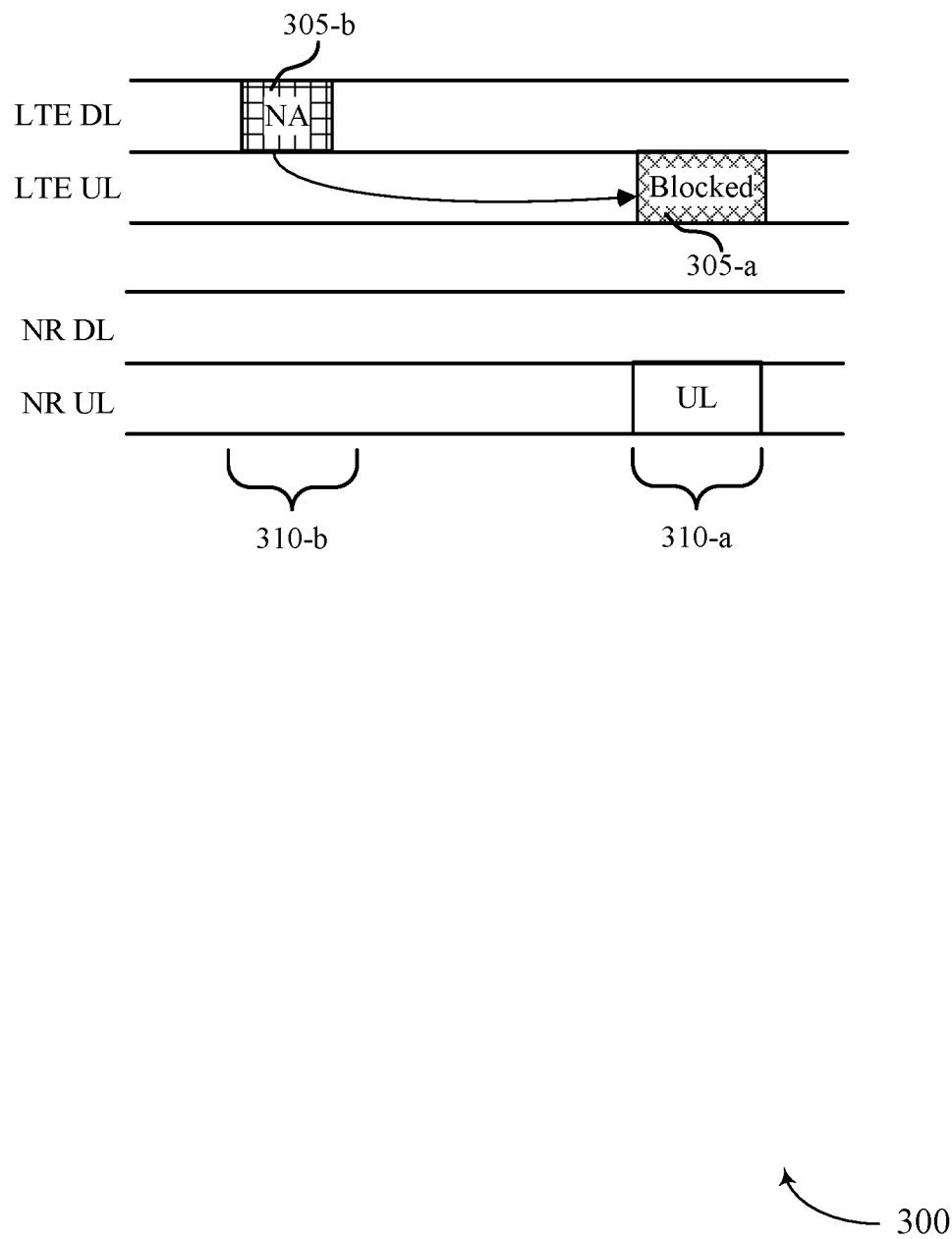
FIG. 3 illustrates an example of a UE HARQ timeline that supports UE-specific HARQ timeline offset in accordance with aspects of the present disclosure.

FIG. 3 illustrates an example of a UE HARQ timeline 300 that supports UE-specific HARQ timeline offset in accordance with various aspects of the present disclosure. In some examples, UE HARQ timeline 300 may implement aspects of wireless communications system 100 and wireless communications system 200. HARQ timeline 300 may illustrate aspects of UE-specific HARQ timeline offset techniques as described herein. In some cases, UE HARQ timeline 300 may represent aspects of techniques performed by a UE 115 or base station 105 as described with reference to FIGS. 1-2. UE HARQ timeline 300 may represent the perspective of a single UE 115, configured with an LTE carrier and a NR carrier. UE HARQ timeline 300 in FIG. 3 illustrates a downlink LTE timeline, an uplink LTE timeline, a downlink NR timeline, and an uplink NR timeline. In some aspects, the LTE timelines may be in an FDD configuration, while the NR timelines may be in a TDD configuration.

UE HARQ timeline 300 may illustrate how an uplink transmission on a carrier (e.g., a NR uplink transmission) may block a TTI associated with another supported carrier (e.g., LTE transmissions). For example, a NR uplink transmission during a TTI 310-*a* may block HARQ uplink during the TTI 310-*a* (e.g., via slot 305-*a*). In some cases, the NR uplink transmission during a TTI 310-*a* may further block potential downlink transmission associated with TTI 310-*b*. That is, TTI 310-*b* may contain downlink LTE transmissions for which HARQ feedback is expected during TTI 310-*a* (e.g., which may occur 4 ms, or some other predetermined amount of time, later). If the TTI 310-*a* is blocked for uplink HARQ transmissions, a base station may not transmit downlink in TTIs associated with HARQ feedback that would occur in the TTI 310-*a*, such that the NR transmission during TTI 310-*a* may effectively have blocked TTI 310-*b* as well. Such may only occur in instances when it is known in advance that a NR transmission is scheduled during TTI 310-*a*. In cases where the NR transmissions is not known in advance, a base station may still transmit downlink during TTI 310-*b*, however the uplink HARQ may be blocked, which may result in initiation of recovery procedures (e.g., as the base station will not receive any ACKs or NAKs from the UE).

Figure 4:
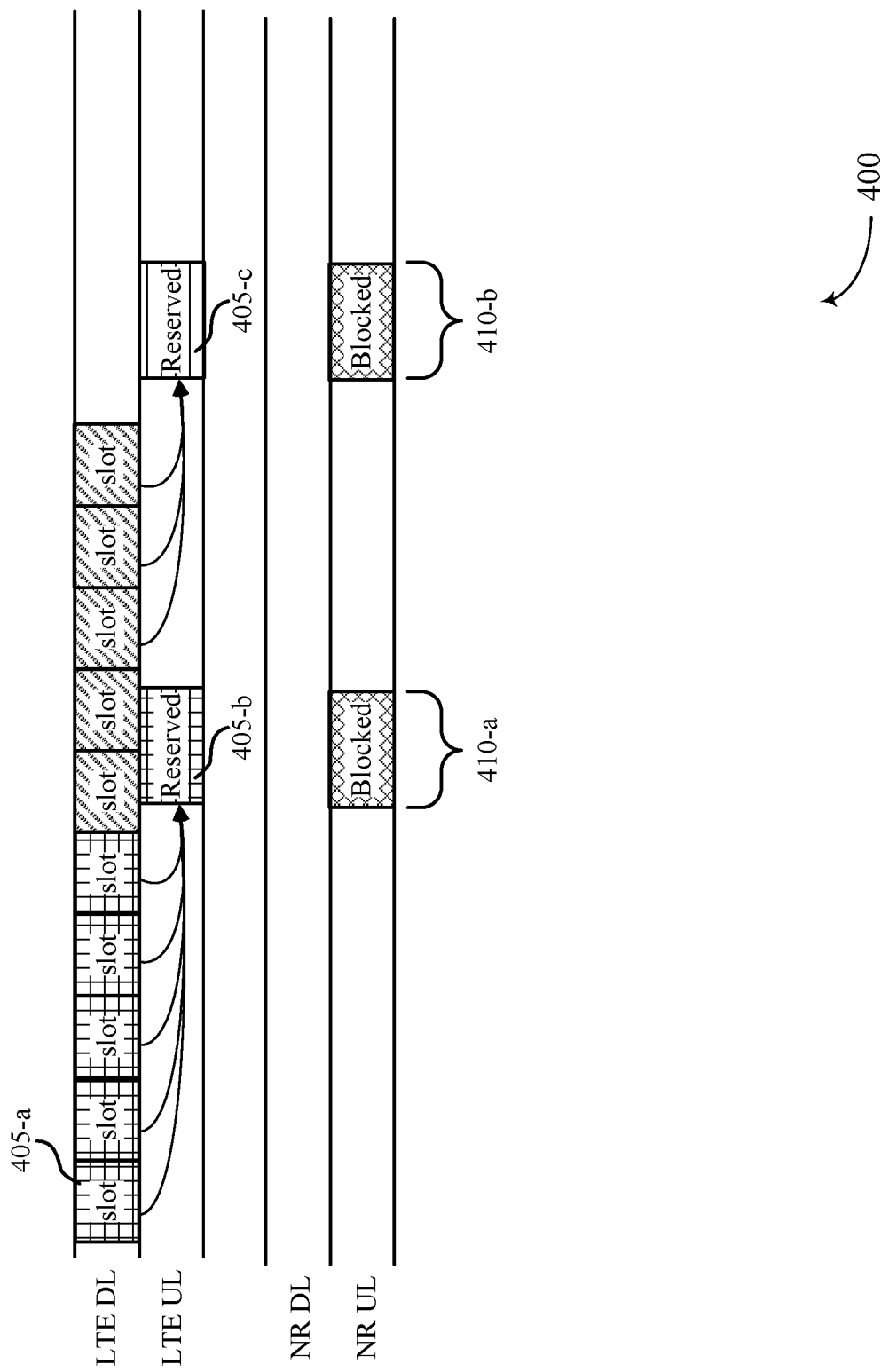
FIG. 4 illustrates an example of a UE HARQ timeline that supports UE-specific HARQ timeline offset in accordance with aspects of the present disclosure.

FIG. 4 illustrates an example of a UE HARQ timeline 400 that supports UE-specific HARQ timeline offset in accordance with various aspects of the present disclosure. In some examples, UE HARQ timeline 400 may implement aspects of wireless communications system 100 and wireless communications system 200. HARQ timeline 400 may illustrate aspects of UE-specific HARQ timeline offset techniques as described herein. In some cases, UE HARQ timeline 400 may represent aspects of techniques performed by a UE 115 or base station 105 as described with reference to FIGS. 1-3. UE HARQ timeline 400 may represent the perspective of a single UE 115, configured with an LTE carrier and a NR carrier. UE HARQ timeline 400 in FIG. 4 illustrates a downlink LTE timeline, an uplink LTE timeline, a downlink NR timeline, and an uplink NR timeline. In some aspects, the LTE timelines may be in an FDD configuration, while the NR timelines may be in a TDD configuration.

UE HARQ timeline 400 may illustrate TTIs 410 that are designated for HARQ feedback associated with multiple downlink TTIs or slots (e.g., several downlink subframes may map to a single uplink subframe for HARQ feedback, thus reducing the amount of reserved or blocked TTIs for uplink HARQ). In the present example, 5 downlink slots or subframes may map to each TTI reserved for uplink HARQ transmissions. For every 5 slots (e.g., starting at slot 405-*a*) a single slot may be reserved for uplink HARQ feedback (e.g., slot 405-*b*). In the example of FIG. 4, uplink slots or TTIs may be offset from downlink slots or TTIs. Such an offset may or may not be present, depending on a wireless communications systems configuration.

UE HARQ timeline 400 illustrates how designating a HARQ feedback TTI for multiple downlink TTIs may reduce the number of TTIs blocked for communications via another carrier (e.g., reduce the number of TTIs blocked for NR transmissions). That is, UE HARQ timeline 400 illustrates how TTI 410-*a* and TTI 410-*b* may be reserved for 10 downlink slots 405, compared to needing 10 TTIs reserved. When UEs 115 within a wireless communications system have aligned HARQ timelines, such a reduction in the amount of TTIs reserved for uplink HARQ may increase NR uplink capacity (however TTIs 410-*a* and 410-*b* may still be lost for NR uplink).

Figure 5:
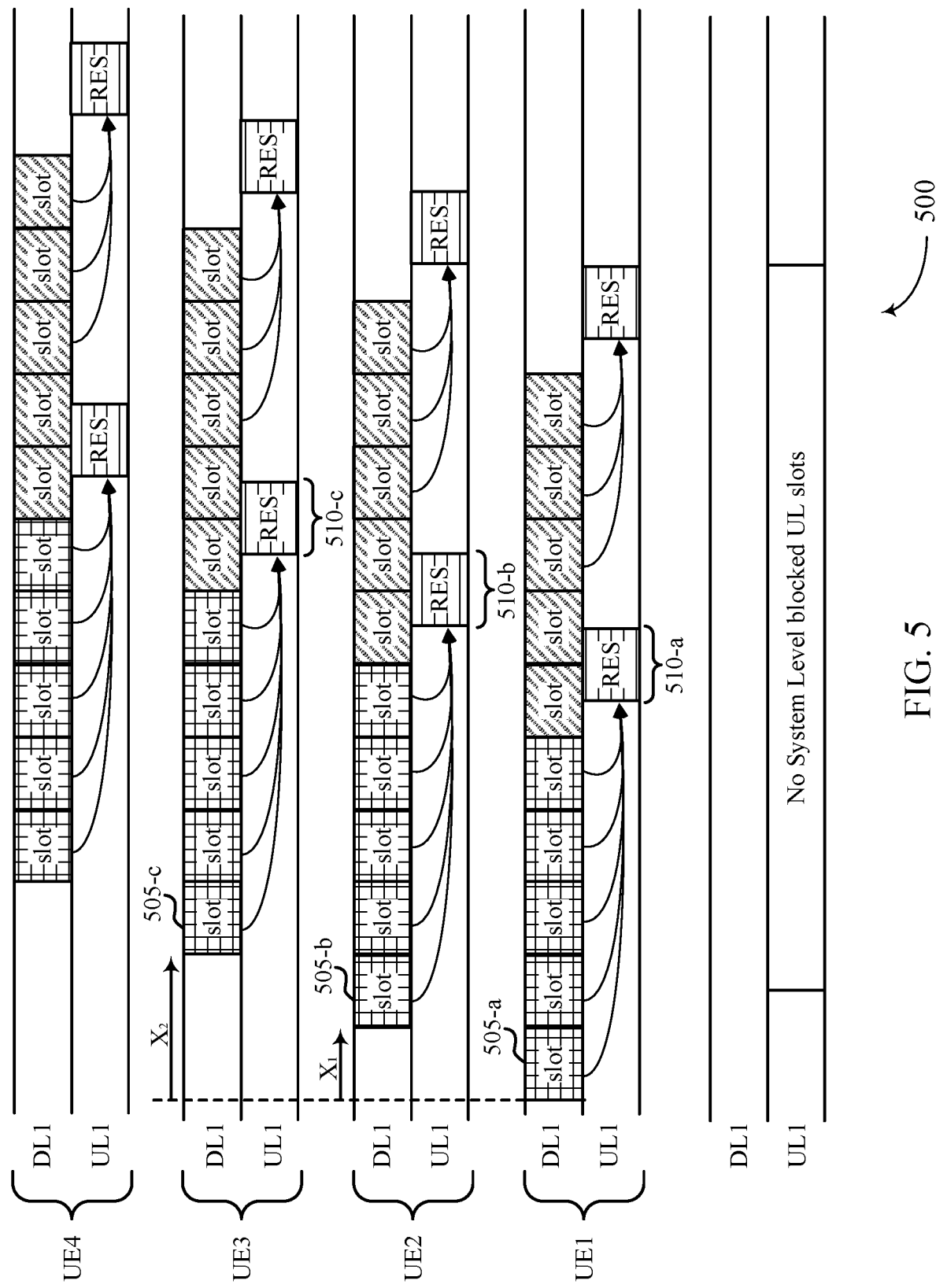
FIG. 5 illustrates an example of a network HARQ timeline that supports UE-specific HARQ timeline offset in accordance with aspects of the present disclosure.

FIG. 5 illustrates an example of a network HARQ timeline 500 that supports UE-specific HARQ timeline offset in accordance with various aspects of the present disclosure. In some examples, network HARQ timeline 500 may implement aspects of wireless communications system 100 and wireless communications system 200. In some cases, network HARQ timeline 500 may represent aspects of techniques performed by a UE 115 or base station 105 as described with reference to FIGS. 1-3. Specifically, network HARQ timeline 500 may illustrate multiple UE-specific HARQ timelines exemplifying an offset such that TTIs are available for other carrier transmissions at the network level (e.g., one or more specific TTIs are not blocked or unavailable across all UEs within the network).

Network HARQ timeline 500 illustrates how multiple UEs 115 (e.g., UE1, UE2, UE3, and UE4) may have offset HARQ timelines (e.g., UE-specific offset HARQ timelines) in order to reduce or eliminate system wide TTI blockage for other carriers (e.g., to reduce or eliminate system wide TTI loss for NR uplink). According to techniques described herein, each UE may receive or identify a UE-specific offset (e.g., X) and communicate via a UE-specific offset HARQ timeline.

For example, UE1 may have an offset of zero (e.g., X=0), and may be associated with a reserved TTI 510-*a* for uplink HARQ transmissions associated with slot 505-*a*. UE2 may have an offset of one TTI (e.g., $X_1=1$, $X_1=0.5$ ms, $X_1=1$ ms, etc.). In such a case, UE2 may be associated with a reserved TTI 510-*b* that is offset from TTI 510-*a* by $X_1$ (e.g., by one TTI). Further, UE3 may have an offset of two TTIs (e.g., $X_2=2$, $X_2=1$ ms, $X_2=2$ ms, etc.). In such a case, UE3 may be associated with a reserved TTI 510-*c* that is offset from TTI 510-*a* by $X_2$ (e.g., by two TTIs). The base station may thus expect HARQ feedback from UE1 at TTI 510-*a*, expect HARQ feedback from UE2 at TTI 510-*a*+$X_1$, expect HARQ feedback from UE3 at TTI 510-*a*+$X_2$, etc.

In general, FIG. 5 may illustrate techniques for distributed reserved TTIs (e.g., for LTE uplink HARQ transmissions). Such may enable other UEs to utilize TTIs for NR transmissions so long as the TTI does not correspond with a reserved TTI associated with it's own HARQ timeline. That is, such techniques may reduce or eliminate system wide TTI blockage for NR carriers, as blocked TTIs may be on a per UE basis.

Adding UE-specific TTI or HARQ timeline offset in the reference downlink/uplink configuration to the HARQ timeline may enable distribution of fixed LTE subframes. Different offsets (e.g., X values) to downlink and/or uplink slot indices for different UEs may result in avoidance of both LTE and NR TTI loss from the systems perspective. Further, in order to avoid PUCCH resource collision, X values may be chosen such that there is no uplink overlap between UEs that are given different X values. Alternatively, different UEs can be configured with different PUCCH resource offset or the resource offset may be a function of X.

Figure 6:
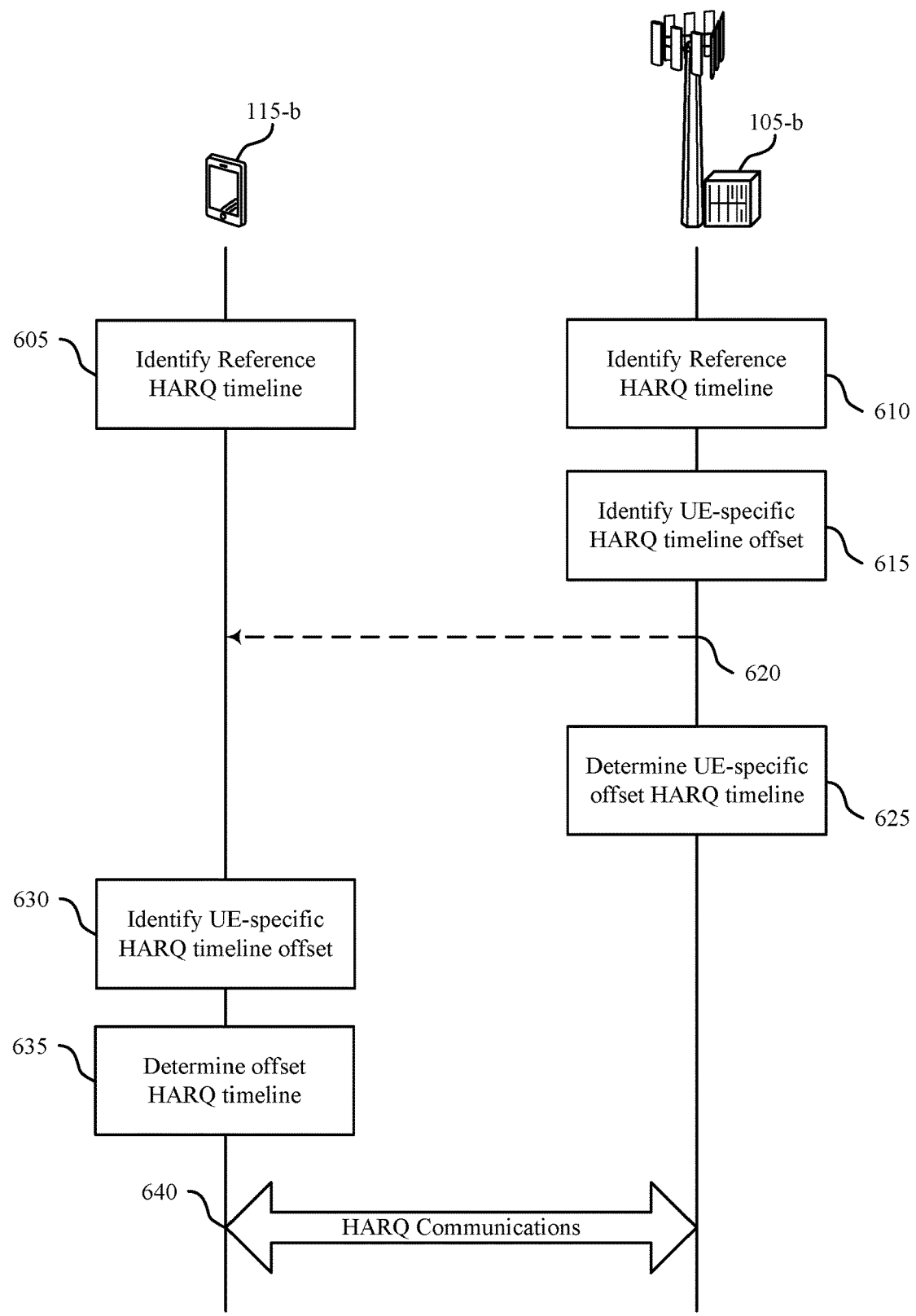
FIG. 6 illustrates an example of a process flow that supports UE-specific HARQ timeline offset in accordance with aspects of the present disclosure.

FIG. 6 illustrates an example of a process flow 600 that supports UE-specific HARQ timeline offset in accordance with various aspects of the present disclosure. In some examples, process flow 600 may implement aspects of wireless communication system 100. Process flow 600 may include UE 115-b and base station 105-b, which may be examples of or which may represent aspects of techniques performed by a UE 115 or base station 105 as described with reference to FIGS. 1-5.

At 605 and 610, UE 115-b and base station 105-b may identify a reference HARQ timeline. 605 and 610 may occur at the same time, or at different points in time. In some cases, the reference HARQ timeline may be configured by the network, or implicitly derived. For example, at 605, UE 115-b may receive an indication of the reference HARQ timeline in system information for a cell in which the UE is communicating. In other cases, base station 105-b may transmit an indication of the reference HARQ timeline (e.g., via system information or other RRC signaling).

At 615, base station 105-b may identify a UE-specific HARQ timeline offset (e.g., a HARQ timeline offset, X, specific to UE 115-b). In some cases, the base station 105-b may determine different UE-specific HARQ timeline offsets for other UEs served by the base station (not shown). In some cases, the offset may be determined such that overlap of corresponding TTIs in which uplink HARQ is received (e.g., from UE 115-b and other served UEs) may be avoided, to avoid PUCCH resource collisions between one or more UEs 115, etc. In other cases, the UE-specific HARQ timeline offset may be determined based on information received from the UE 115-b.

At 620, the base station 105-b may optionally transmit an indication of the UE-specific HARQ timeline offset to UE 115-b. In some cases, the indication of the UE-specific HARQ timeline offset may be transmitted via indication via downlink control information (DCI) or via radio resource control (RRC) messaging.

At 625, base station 105-b may determine a UE-specific offset HARQ timeline for UE 115-b. For example, the base station 105-b may apply the UE-specific offset identified at 615 and apply the offset to the reference HARQ timeline identified at 610. The base station 105-b may use the determined UE-specific offset HARQ timeline (e.g., for UE 115-b and any other UE-specific offset HARQ timelines for other served UEs not shown) to understand or identify when to expect HARQ feedback from a given UE (e.g., at some TTI plus the identified UE-specific offset).

At 630, UE 115-b may identify a UE-specific HARQ timeline offset (e.g., an offset value X). In some cases, the offset may be explicitly or implicitly derived from the indication received at 620. In other cases, the offset may be predetermined, configured by the network, or determined based on rules known by the UE. For example, the UE may use it's UE ID to determine its offset.

At 635, UE 115-b may determine an offset HARQ timeline (e.g., specific to UE 115-b) based on the reference HARQ timeline identified at 605 and the UE-specific HARQ timeline offset identified at 630. That is, the UE 115-b may apply the UE-specific HARQ timeline offset to the reference HARQ timeline. Determining the UE-specific offset HARQ timeline may include adding the UE-specific HARQ timeline offset to downlink and/or uplink TTI indices in the reference HARQ timeline, adjusting downlink and/or uplink TTI indices in the reference HARQ timeline by a function of the UE-specific HARQ timeline offset.

At 640, UE 115-b and base station 105-b may communicate according to the UE-specific offset HARQ timeline. For example, UE 115-b may transmit one or more ACKs and/or NAKs in accordance with the UE-specific offset HARQ timeline (e.g., according to a TTI determined via the UE-specific offset HARQ timeline). In some cases, the one or more ACKs/NAKs in the TTI may correspond to a plurality of previous downlink transmissions. In some cases, UE 115-b may be configured to communicate using multiple RATs via TDM, and may communicate with the base station 105-b via LTE.

Figure 7:
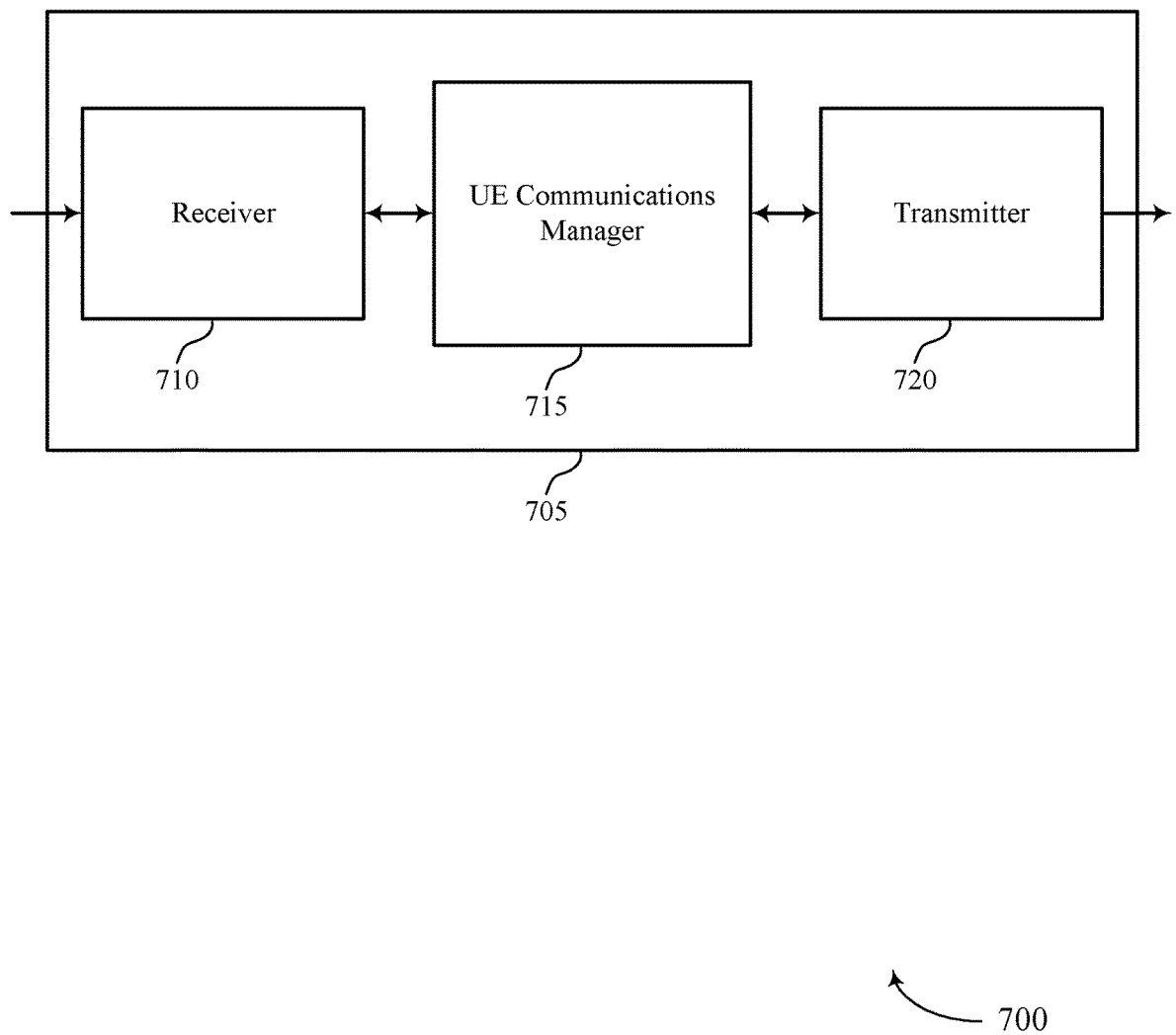
FIGS. 7 through 9 show block diagrams of a device that supports UE-specific HARQ timeline offset in accordance with aspects of the present disclosure.

FIG. 7 shows a block diagram 700 of a wireless device 705 that supports UE-specific HARQ timeline offset in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to UE-specific HARQ timeline offset, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may identify a reference HARQ timeline, identify a UE-specific HARQ timeline offset to be applied by the UE to the reference HARQ timeline, determine a UE-specific offset HARQ timeline by applying the UE-specific HARQ timeline offset to the reference HARQ timeline, and transmit one or more acknowledgements in a TTI in accordance with the UE-specific offset HARQ timeline.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
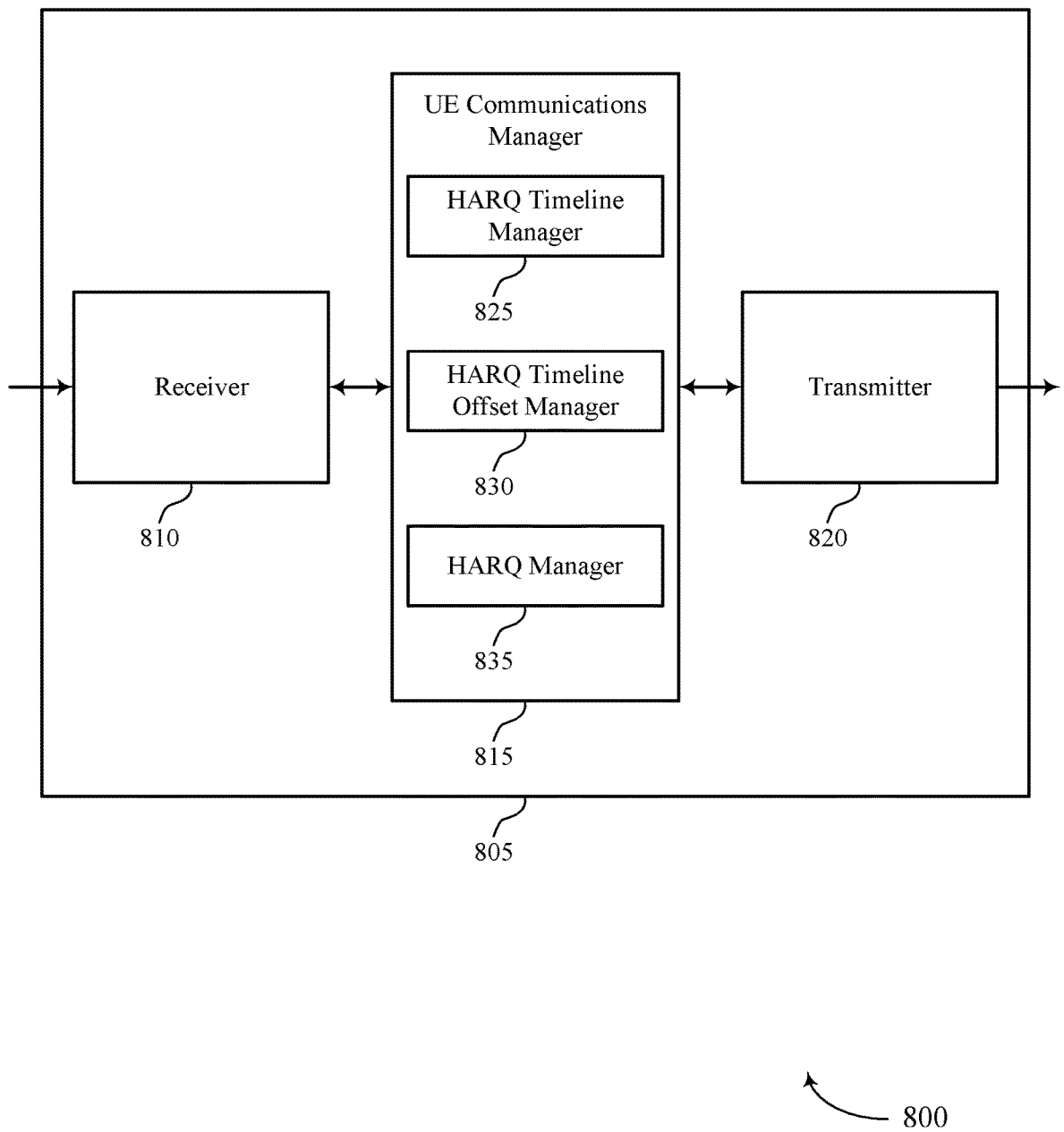

FIG. 8 shows a block diagram 800 of a wireless device 805 that supports UE-specific HARQ timeline offset in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to UE-specific HARQ timeline offset, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include HARQ timeline manager 825, HARQ timeline offset manager 830, and HARQ manager 835.

HARQ timeline manager 825 may identify a reference HARQ timeline and determine a UE-specific offset HARQ timeline by applying the UE-specific HARQ timeline offset to the reference HARQ timeline. In some cases, determining the UE-specific offset HARQ timeline includes: adding the UE-specific HARQ timeline offset to uplink TTI indices in the reference HARQ timeline. In some cases, identifying the reference HARQ timeline includes: receiving an indication of the reference HARQ timeline in system information (or other RRC signaling) for a cell in which the UE is communicating.

HARQ timeline offset manager 830 may identify a UE-specific HARQ timeline offset to be applied by the UE to the reference HARQ timeline. In some cases, determining the UE-specific offset HARQ timeline includes adjusting uplink TTI indices in the reference HARQ timeline by a function of the UE-specific HARQ timeline offset. In some cases, identifying the UE-specific HARQ timeline offset includes receiving an indication of the UE-specific HARQ timeline offset from a base station. In some cases, receiving the indication of the UE-specific HARQ timeline offset includes receiving the indication via DCI or via RRC messaging. In some cases, identifying the UE-specific HARQ timeline offset includes determining the UE-specific HARQ timeline offset based on rules known by the UE. In some cases, identifying the UE-specific HARQ timeline offset includes determining the UE-specific HARQ timeline offset based on an identification (ID) of the UE.

HARQ manager 835 may transmit one or more acknowledgements in a TTI in accordance with the UE-specific offset HARQ timeline. In some cases, the UE is configured to communicate using multiple RATs via TDM. In some cases, the UE is configured to communicate using both LTE and NR, and where the one or more acknowledgements are transmitted as LTE communications. In some cases, the one or more acknowledgements in the TTI correspond to a set of previous downlink transmissions.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
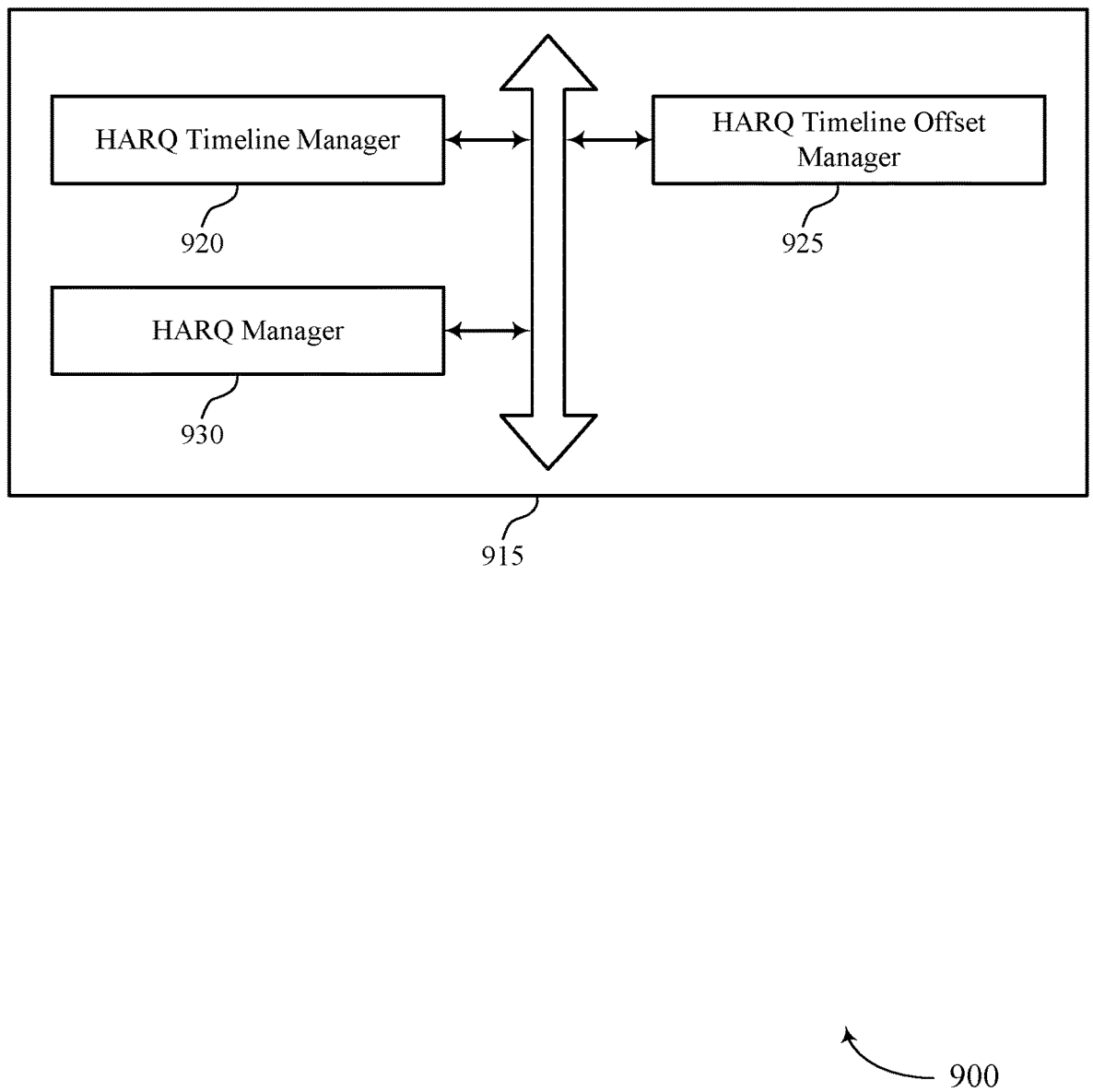

FIG. 9 shows a block diagram 900 of a UE communications manager 915 that supports UE-specific HARQ timeline offset in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include HARQ timeline manager 920, HARQ timeline offset manager 925, and HARQ manager 930. Each of these modules may communicate, directly or indirectly, with one another (e.g., via one or more buses).

HARQ timeline manager 920 may identify a reference HARQ timeline and determine a UE-specific offset HARQ timeline by applying the UE-specific HARQ timeline offset to the reference HARQ timeline. In some cases, determining the UE-specific offset HARQ timeline includes adding the UE-specific HARQ timeline offset to uplink TTI indices in the reference HARQ timeline. In some cases, identifying the reference HARQ timeline includes receiving an indication of the reference HARQ timeline in system information (or other RRC signaling) for a cell in which the UE is communicating.

HARQ timeline offset manager 925 may identify a UE-specific HARQ timeline offset to be applied by the UE to the reference HARQ timeline. In some cases, determining the UE-specific offset HARQ timeline includes adjusting uplink TTI indices in the reference HARQ timeline by a function of the UE-specific HARQ timeline offset. In some cases, identifying the UE-specific HARQ timeline offset includes receiving an indication of the UE-specific HARQ timeline offset from a base station. In some cases, receiving the indication of the UE-specific HARQ timeline offset includes receiving the indication via DCI or via RRC messaging. In some cases, identifying the UE-specific HARQ timeline offset includes determining the UE-specific HARQ timeline offset based on rules known by the UE. In some cases, identifying the UE-specific HARQ timeline offset includes determining the UE-specific HARQ timeline offset based on an identification (ID) of the UE.

HARQ manager 930 may transmit one or more acknowledgements in a TTI in accordance with the UE-specific offset HARQ timeline. In some cases, the UE is configured to communicate using multiple RATs via TDM. In some cases, the UE is configured to communicate using both LTE and NR, and where the one or more acknowledgements are transmitted as LTE communications. In some cases, the one or more acknowledgements in the TTI correspond to a set of previous downlink transmissions.

Figure 10:
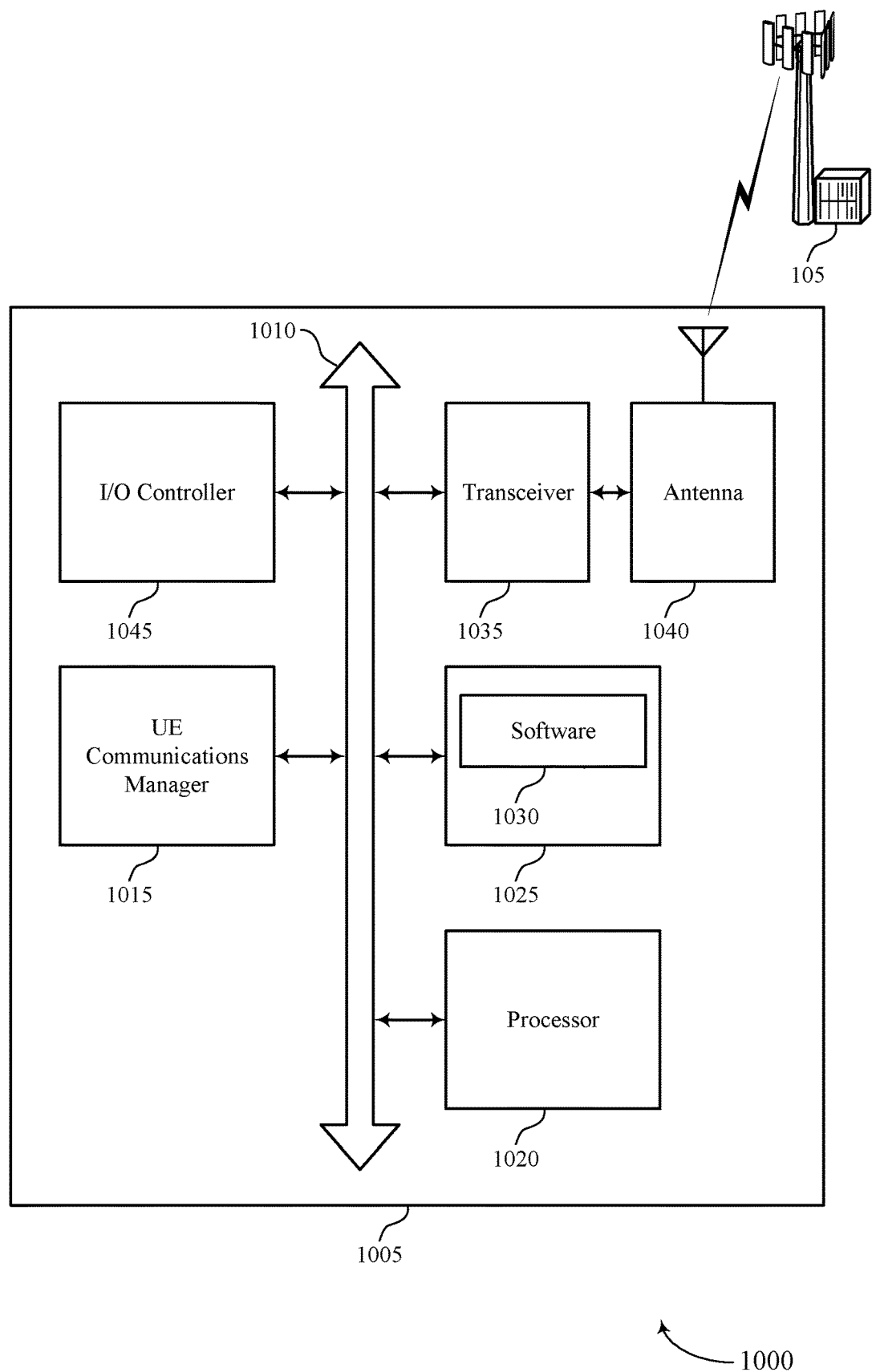
FIG. 10 illustrates a block diagram of a system including a UE that supports UE-specific HARQ timeline offset in accordance with aspects of the present disclosure.

FIG. 10 shows a diagram of a system 1000 including a device 1005 that supports UE-specific HARQ timeline offset in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting UE-specific HARQ timeline offset).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support UE-specific HARQ timeline offset. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
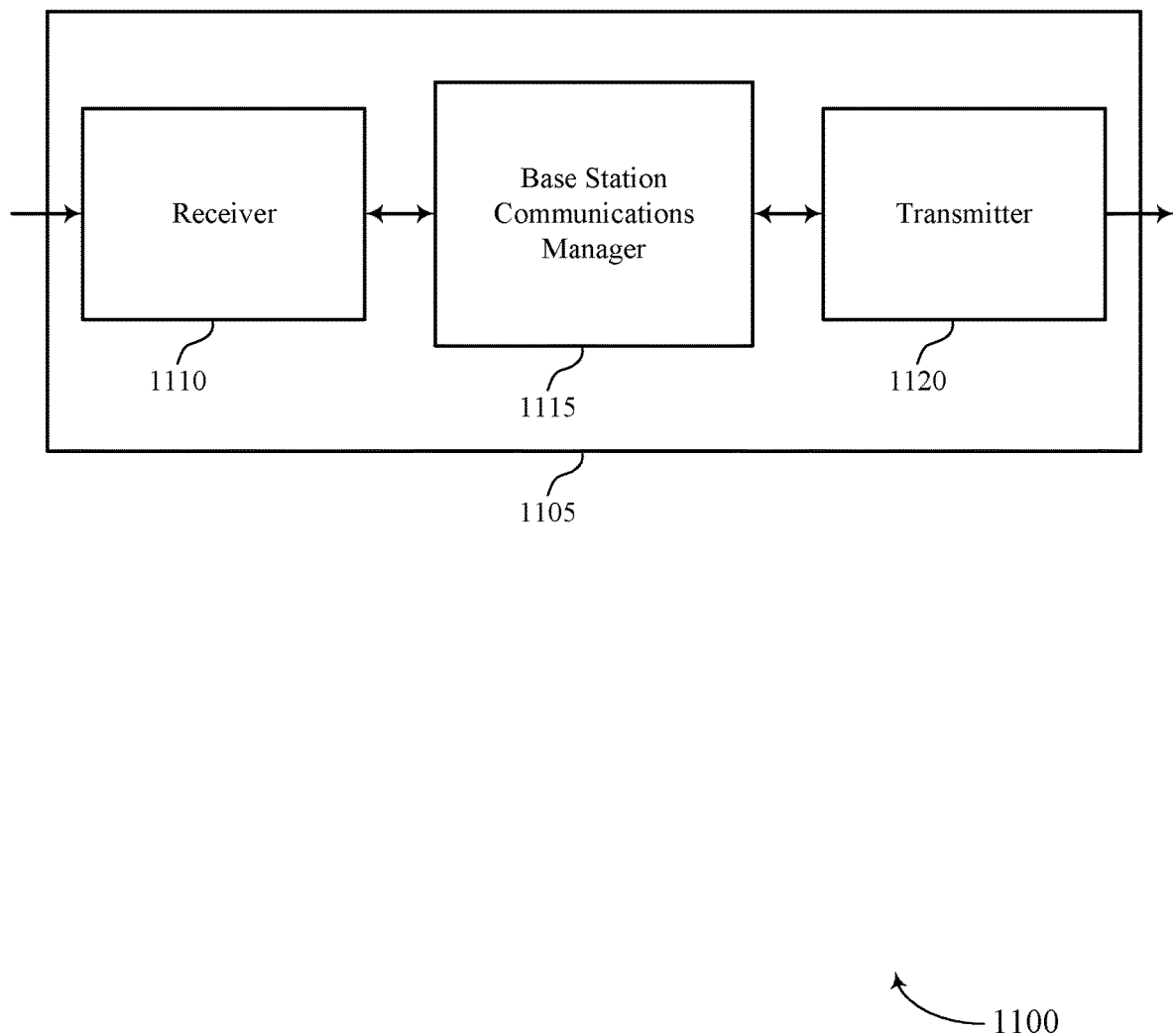
FIGS. 11 through 13 show block diagrams of a device that supports UE-specific HARQ timeline offset in accordance with aspects of the present disclosure.

FIG. 11 shows a block diagram 1100 of a wireless device 1105 that supports UE-specific HARQ timeline offset in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to UE-specific HARQ timeline offset, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify a reference HARQ timeline, determine one or more UE-specific HARQ timeline offsets to be applied by a corresponding one or more UEs to the reference HARQ timeline, determine corresponding UE-specific offset HARQ timelines by applying respective UE-specific HARQ timeline offsets to the reference HARQ timeline, and communicate with the one or more UEs in accordance with the corresponding UE-specific offset HARQ timelines.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
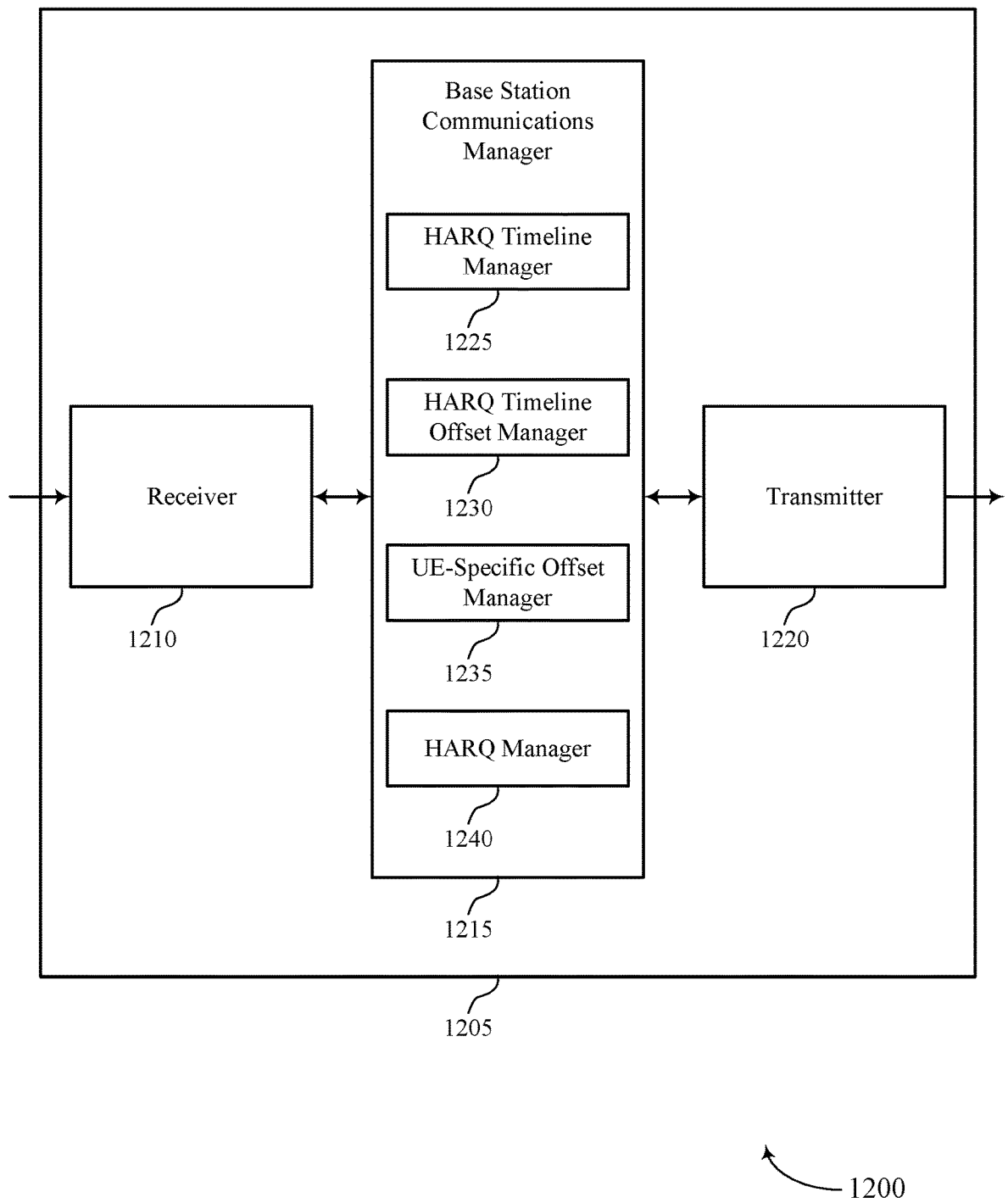

FIG. 12 shows a block diagram 1200 of a wireless device 1205 that supports UE-specific HARQ timeline offset in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to UE-specific HARQ timeline offset, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include HARQ timeline manager 1225, HARQ timeline offset manager 1230, UE-specific offset manager 1235, and HARQ manager 1240.

HARQ timeline manager 1225 may identify a reference HARQ timeline. HARQ timeline offset manager 1230 may determine one or more UE-specific HARQ timeline offsets to be applied by a corresponding one or more UEs to the reference HARQ timeline. In some cases, determining the one or more UE-specific HARQ timeline offsets includes determining different UE-specific HARQ timeline offsets for each of the corresponding one or more UEs. In some cases, determining the one or more UE-specific HARQ timeline offsets includes determining UE-specific HARQ timeline offsets for each of the corresponding one or more UEs so as to avoid overlap of corresponding TTIs in which acknowledgements are received from the one or more UEs. In some cases, determining the one or more UE-specific HARQ timeline offsets includes determining UE-specific HARQ timeline offsets for each of the corresponding one or more UEs so as to avoid PUCCH resource collisions between the one or more UEs. In some cases, determining the one or more UE-specific HARQ timeline offsets includes determining the UE-specific HARQ timeline offset based on information received from the corresponding one or more UEs. In some cases, at least some of the one or more UEs are configured to communicate using multiple RATs via TDM, and where communicating by the base station with the one or more UEs is via LTE.

UE-specific offset manager 1235 may determine corresponding UE-specific offset HARQ timelines by applying respective UE-specific HARQ timeline offsets to the reference HARQ timeline.

HARQ manager 1240 may communicate with the one or more UEs in accordance with the corresponding UE-specific offset HARQ timelines. In some cases, communicating with the one or more UEs includes receiving, from at least one of the one or more UEs, one or more acknowledgements in a corresponding TTI in accordance with the corresponding UE-specific offset HARQ timeline.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
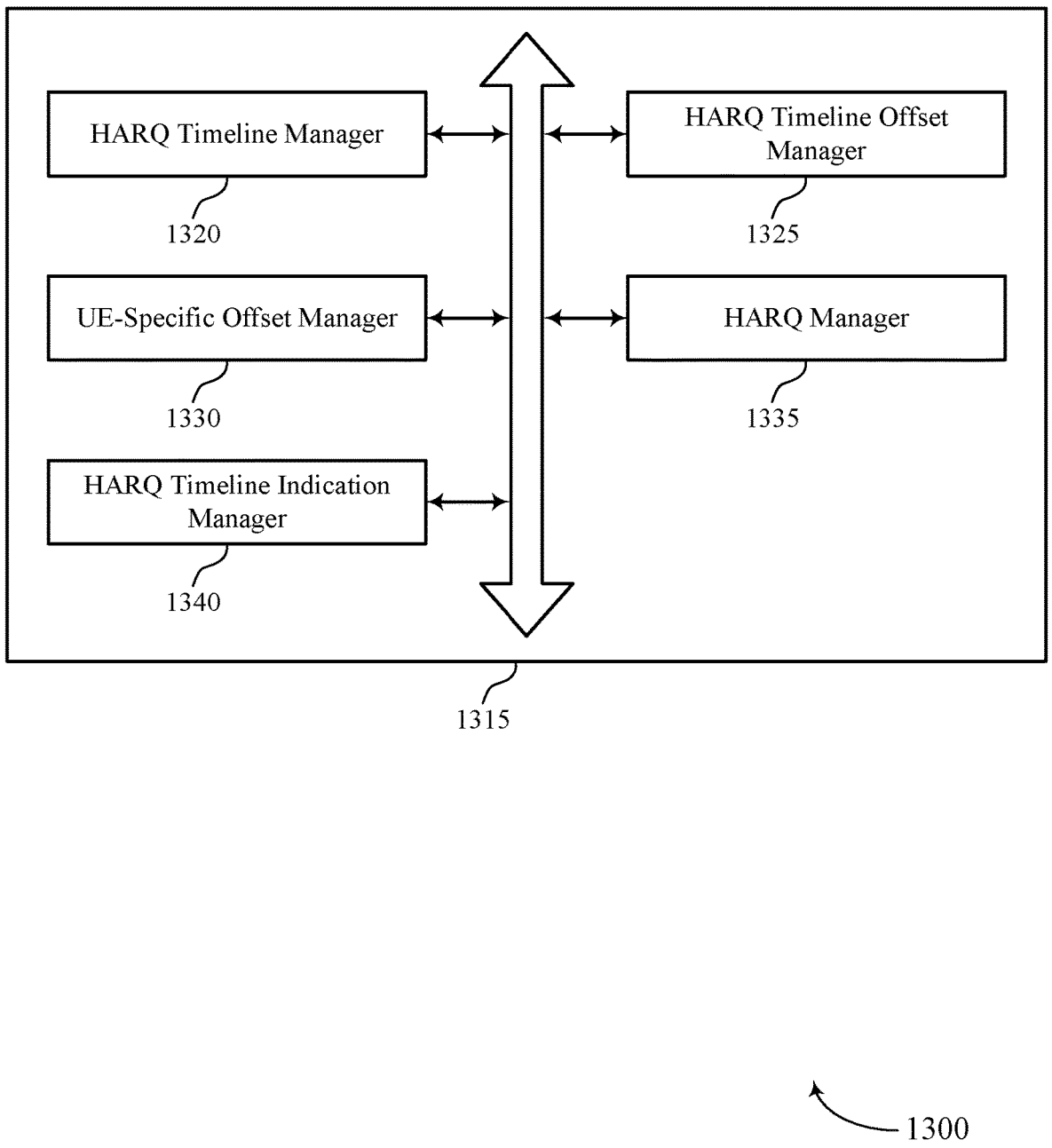

FIG. 13 shows a block diagram 1300 of a base station communications manager 1315 that supports UE-specific HARQ timeline offset in accordance with aspects of the present disclosure. The base station communications manager 1315 may be an example of aspects of a base station communications manager 1415 described with reference to FIGS. 11, 12, and 14. The base station communications manager 1315 may include HARQ timeline manager 1320, HARQ timeline offset manager 1325, UE-specific offset manager 1330, HARQ manager 1335, and HARQ timeline indication manager 1340. Each of these modules may communicate, directly or indirectly, with one another (e.g., via one or more buses).

HARQ timeline manager 1320 may identify a reference HARQ timeline.

HARQ timeline offset manager 1325 may determine one or more UE-specific HARQ timeline offsets to be applied by a corresponding one or more UEs to the reference HARQ timeline. In some cases, determining the one or more UE-specific HARQ timeline offsets includes determining different UE-specific HARQ timeline offsets for each of the corresponding one or more UEs. In some cases, determining the one or more UE-specific HARQ timeline offsets includes determining UE-specific HARQ timeline offsets for each of the corresponding one or more UEs so as to avoid overlap of corresponding TTIs in which acknowledgements are received from the one or more UEs. In some cases, determining the one or more UE-specific HARQ timeline offsets includes determining UE-specific HARQ timeline offsets for each of the corresponding one or more UEs so as to avoid PUCCH resource collisions between the one or more UEs. In some cases, determining the one or more UE-specific HARQ timeline offsets includes: determining the UE-specific HARQ timeline offset based on information received from the corresponding one or more UEs. In some cases, at least some of the one or more UEs are configured to communicate using multiple RATs via TDM, and where communicating by the base station with the one or more UEs is via LTE.

UE-specific offset manager 1330 may determine corresponding UE-specific offset HARQ timelines by applying respective UE-specific HARQ timeline offsets to the reference HARQ timeline.

HARQ manager 1335 may communicate with the one or more UEs in accordance with the corresponding UE-specific offset HARQ timelines. In some cases, communicating with the one or more UEs includes receiving, from at least one of the one or more UEs, one or more acknowledgements in a corresponding TTI in accordance with the corresponding UE-specific offset HARQ timeline.

HARQ timeline indication manager 1340 may indicate the one or more UE-specific HARQ timeline offsets to the corresponding one or more UEs and transmit an indication of the reference HARQ timeline in system information (or other RRC signaling) to the one or more UEs. In some cases, indicating the one or more UE-specific HARQ timeline offsets to the corresponding one or more UEs includes: transmitting an indication of the one or more UE-specific HARQ timeline offsets via DCI or via RRC messaging.

Figure 14:
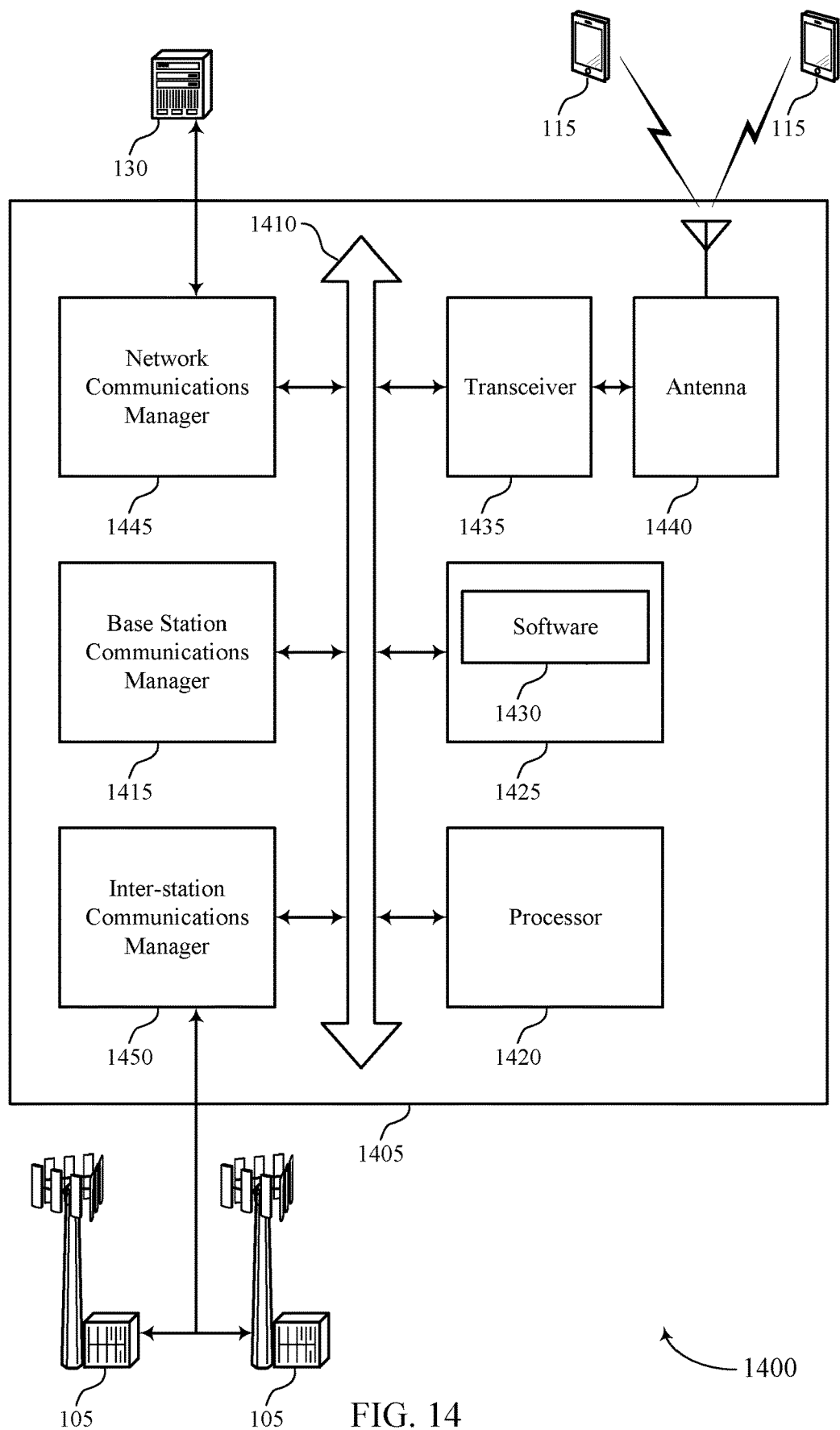
FIG. 14 illustrates a block diagram of a system including a base station that supports UE-specific HARQ timeline offset in accordance with aspects of the present disclosure.

FIG. 14 shows a diagram of a system 1400 including a device 1405 that supports UE-specific HARQ timeline offset in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting UE-specific HARQ timeline offset).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support UE-specific HARQ timeline offset. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
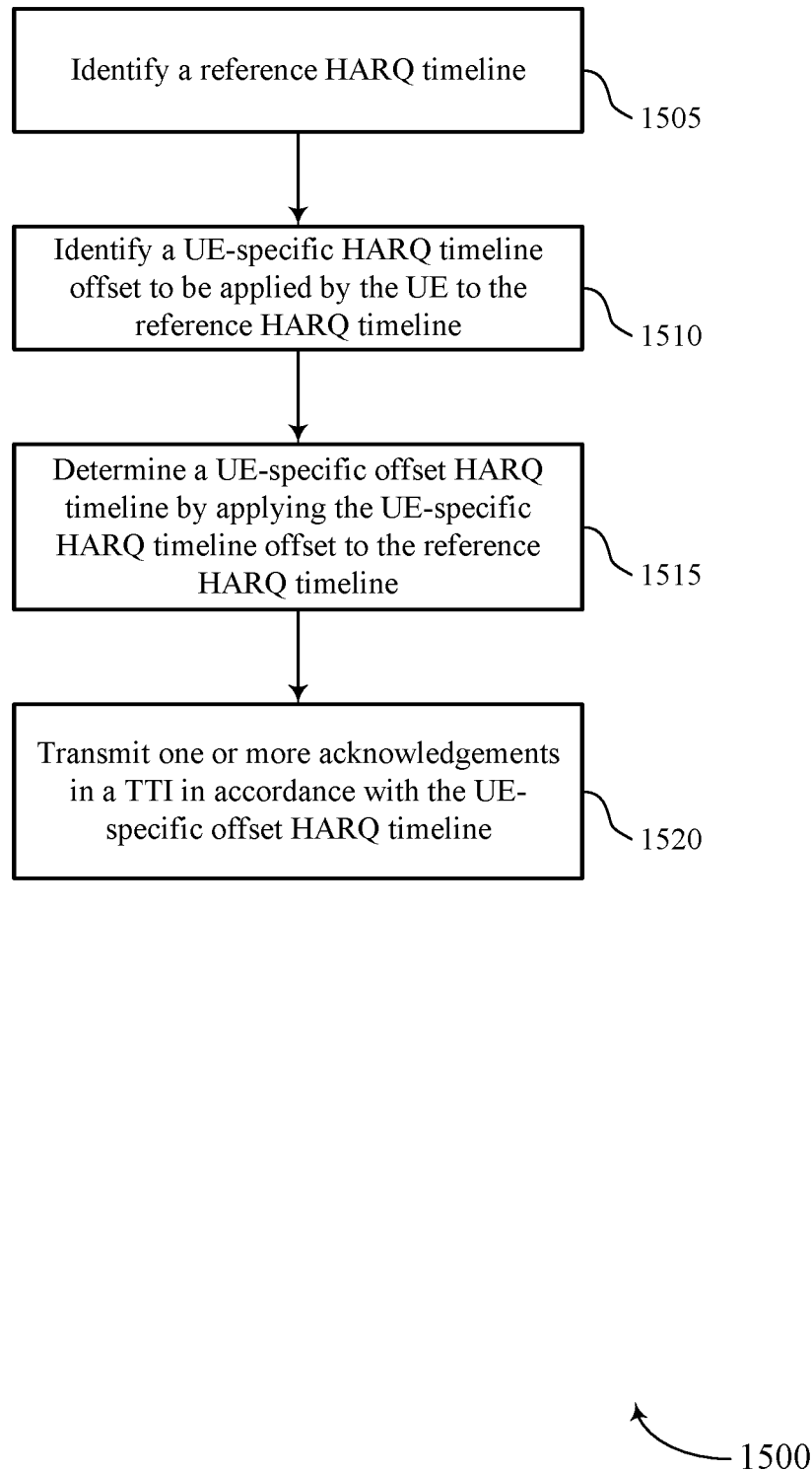
FIGS. 15 through 17 illustrate methods for UE-specific HARQ timeline offset in accordance with aspects of the present disclosure.

FIG. 15 shows a flowchart illustrating a method 1500 for UE-specific HARQ timeline offset in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify a reference HARQ timeline. The operations of block 1505 may be performed according to the methods described herein. In certain examples, aspects of the operations of block 1505 may be performed by a HARQ timeline manager as described with reference to FIGS. 7 through 10.

At block 1510 the UE 115 may identify a UE-specific HARQ timeline offset to be applied by the UE to the reference HARQ timeline. The operations of block 1510 may be performed according to the methods described herein. In certain examples, aspects of the operations of block 1510 may be performed by a HARQ timeline offset manager as described with reference to FIGS. 7 through 10.

At block 1515 the UE 115 may determine a UE-specific offset HARQ timeline by applying the UE-specific HARQ timeline offset to the reference HARQ timeline. The operations of block 1515 may be performed according to the methods described herein. In certain examples, aspects of the operations of block 1515 may be performed by a HARQ timeline manager as described with reference to FIGS. 7 through 10.

At block 1520 the UE 115 may transmit one or more acknowledgements in a TTI in accordance with the UE-specific offset HARQ timeline. The operations of block 1520 may be performed according to the methods described herein. In certain examples, aspects of the operations of block 1520 may be performed by a HARQ manager as described with reference to FIGS. 7 through 10.

Figure 16:
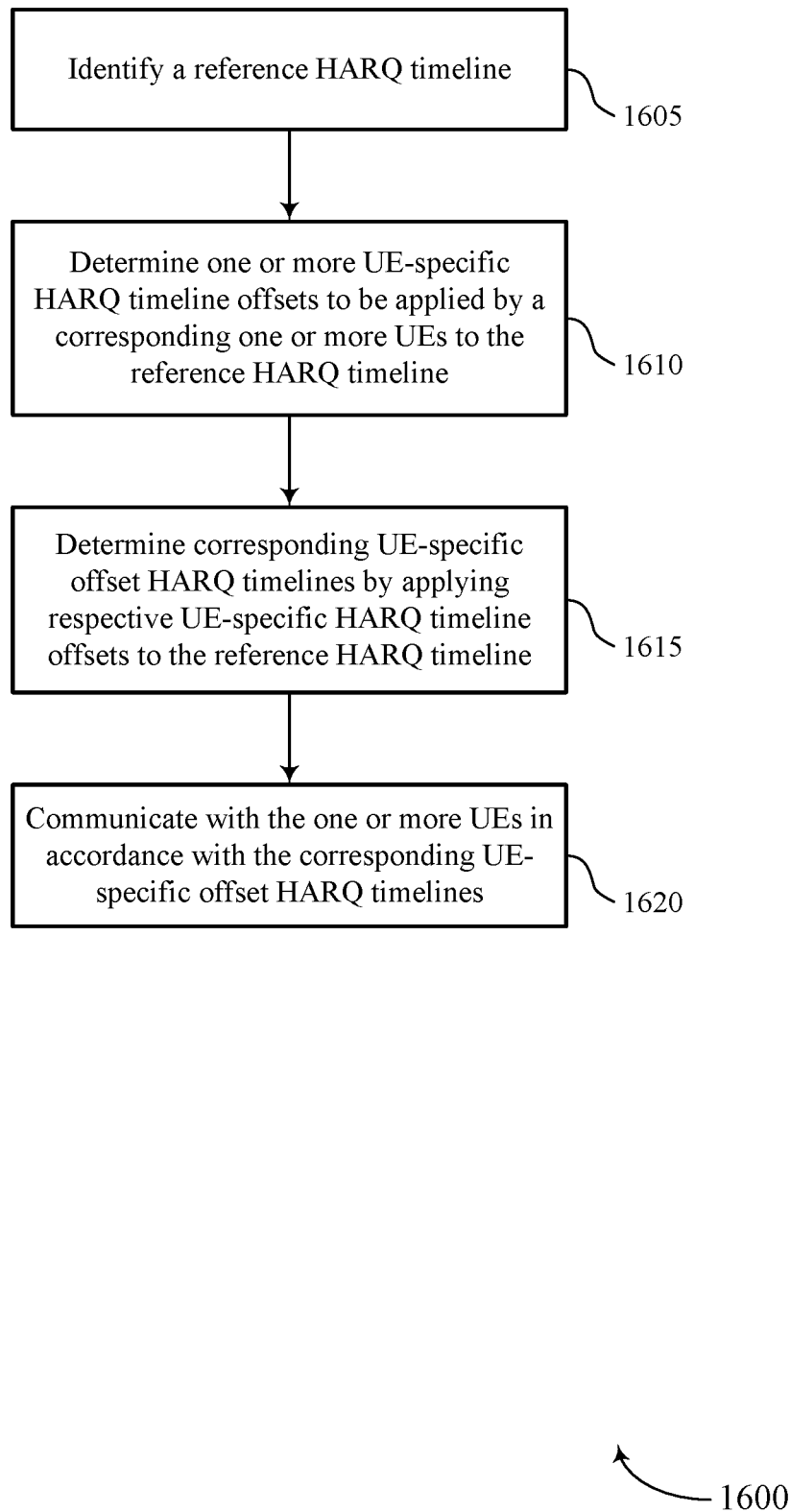

FIG. 16 shows a flowchart illustrating a method 1600 for UE-specific HARQ timeline offset in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below.

Additionally or alternatively, the base station 105 may perform aspects of the functions described below using special-purpose hardware.

At block 1605 the base station 105 may identify a reference HARQ timeline. The operations of block 1605 may be performed according to the methods described herein. In certain examples, aspects of the operations of block 1605 may be performed by a HARQ timeline manager as described with reference to FIGS. 11 through 14.

At block 1610 the base station 105 may determine one or more UE-specific HARQ timeline offsets to be applied by a corresponding one or more UEs to the reference HARQ timeline. The operations of block 1610 may be performed according to the methods described herein. In certain examples, aspects of the operations of block 1610 may be performed by a HARQ timeline offset manager as described with reference to FIGS. 11 through 14.

At block 1615 the base station 105 may determine corresponding UE-specific offset HARQ timelines by applying respective UE-specific HARQ timeline offsets to the reference HARQ timeline. The operations of block 1615 may be performed according to the methods described herein. In certain examples, aspects of the operations of block 1615 may be performed by a UE-specific offset manager as described with reference to FIGS. 11 through 14.

At block 1620 the base station 105 may communicate with the one or more UEs in accordance with the corresponding UE-specific offset HARQ timelines. The operations of block 1620 may be performed according to the methods described herein. In certain examples, aspects of the operations of block 1620 may be performed by a HARQ manager as described with reference to FIGS. 11 through 14.

Figure 17:
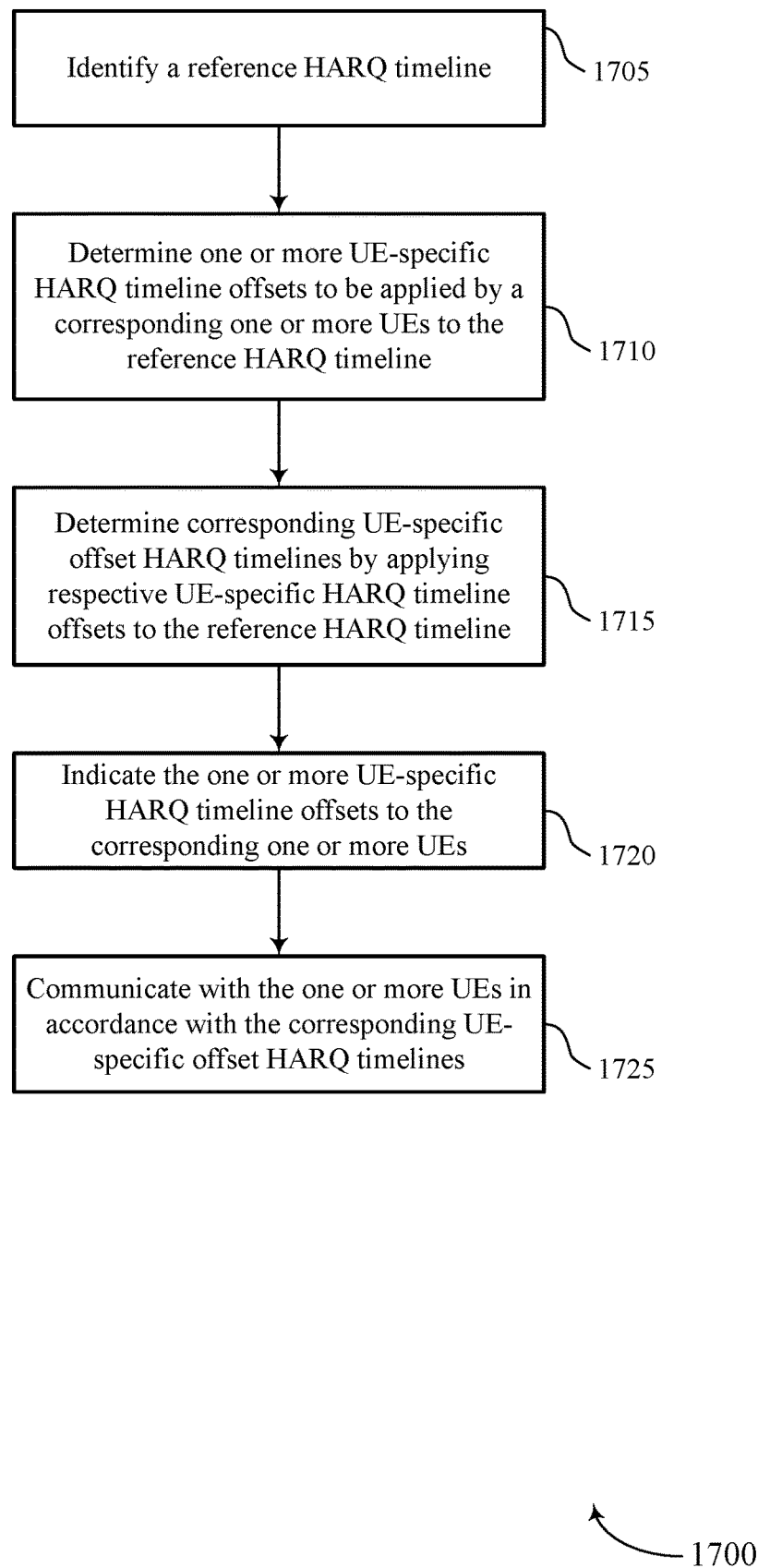

FIG. 17 shows a flowchart illustrating a method 1700 for UE-specific HARQ timeline offset in accordance with aspects of the present disclosure. The operations of method 1700 may be implemented by a base station 105 or its components as described herein. For example, the operations of method 1700 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify a reference HARQ timeline. The operations of block 1705 may be performed according to the methods described herein. In certain examples, aspects of the operations of block 1705 may be performed by a HARQ timeline manager as described with reference to FIGS. 11 through 14.

At block 1710 the base station 105 may determine one or more UE-specific HARQ timeline offsets to be applied by a corresponding one or more UEs to the reference HARQ timeline. The operations of block 1710 may be performed according to the methods described herein. In certain examples, aspects of the operations of block 1710 may be performed by a HARQ timeline offset manager as described with reference to FIGS. 11 through 14.

At block 1715 the base station 105 may determine corresponding UE-specific offset HARQ timelines by applying respective UE-specific HARQ timeline offsets to the reference HARQ timeline. The operations of block 1715 may be performed according to the methods described herein. In certain examples, aspects of the operations of block 1715 may be performed by a UE-specific offset manager as described with reference to FIGS. 11 through 14.

At block 1720 the base station 105 may indicate the one or more UE-specific HARQ timeline offsets to the corresponding one or more UEs. The operations of block 1720 may be performed according to the methods described herein. In certain examples, aspects of the operations of block 1720 may be performed by a HARQ timeline indication manager as described with reference to FIGS. 11 through 14.

At block 1725 the base station 105 may communicate with the one or more UEs in accordance with the corresponding UE-specific offset HARQ timelines. The operations of block 1725 may be performed according to the methods described herein. In certain examples, aspects of the operations of block 1725 may be performed by a HARQ manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying, by a user equipment (UE), a reference hybrid automatic repeat request (HARQ) timeline;
identifying, by the UE, a UE-specific offset, wherein the UE-specific offset indicates a value specific to the UE;
determining, by the UE, a UE-specific HARQ timeline, wherein determining the UE-specific HARQ timeline comprises adding the UE-specific offset to uplink TTI indices in the reference HARQ timeline, wherein the reference HARQ timeline corresponds to a frequency division duplex (FDD) configuration; and
transmitting, by the UE, one or more acknowledgements in a transmission time interval (TTI) in accordance with the UE-specific HARQ timeline.

2. The method of claim 1, wherein identifying the reference HARQ timeline comprises:
receiving an indication of the reference HARQ timeline for a cell in which the UE is communicating.

3. The method of claim 1, wherein identifying the UE-specific offset comprises:
receiving an indication of the UE-specific offset from a base station.

4. The method of claim 3, wherein receiving the indication of the UE-specific offset comprises:
receiving the indication via downlink control information (DCI) or via radio resource control (RRC) messaging.

5. The method of claim 1, wherein identifying the UE-specific offset comprises:
determining the UE-specific offset based at least in part on rules known by the UE.

6. The method of claim 1, wherein identifying the UE-specific offset comprises:
determining the UE-specific offset based at least in part on an identification (ID) of the UE.

7. The method of claim 1, further comprising communicating with a base station using multiple radio access technologies (RATs) via time division multiplexing (TDM).

8. The method of claim 7, wherein communicating with the base station using multiple RATs comprises communicating with the base station using both Long Term Evolution (LTE) and New Radio (NR) radio access technologies, and wherein the one or more acknowledgements are transmitted as LTE communications.

9. The method of claim 8, wherein the LTE RAT is configured for communications.

10. The method of claim 1, wherein the one or more acknowledgements in the TTI correspond to a plurality of previous downlink transmissions.

11. An apparatus for wireless communication, comprising:
a processor;
memory in electronic communication with the processor; and
instructions stored in the memory and operable, when executed by the processor, to cause the apparatus to:
identify a reference hybrid automatic repeat request (HARQ) timeline;
identify a UE-specific offset, wherein the UE-specific offset indicates a value specific to the UE;
determine a UE-specific HARQ timeline by adding the UE-specific offset to uplink TTI indices in the reference HARQ timeline, wherein the reference HARQ timeline corresponds to a frequency division duplex (FDD) configuration; and
transmit one or more acknowledgements in a transmission time interval (TTI) in accordance with the UE-specific HARQ timeline.

12. The apparatus of claim 11, wherein the instructions executable by the processor to cause the apparatus to identify the offset comprise instructions further executable by the processor to cause the apparatus to:
receive an indication of the UE-specific offset from a base station.

13. The apparatus of claim 12, wherein the instructions executable by the processor to cause the apparatus to receive the indication of the UE-specific offset comprise instructions further executable by the processor to cause the apparatus to:
receive the indication via downlink control information (DCI) or via radio resource control (RRC) messaging.

14. The apparatus of claim 11, further comprising the instructions executable by the processor to cause the apparatus to communicate with a base station using multiple radio access technologies (RATs) via time division multiplexing (TDM).

* * * * *